United States Patent
Ramu

(10) Patent No.: US 7,372,232 B2
(45) Date of Patent: May 13, 2008

(54) APPARATUS FOR DRIVE CONTROL, POWER CONVERSION, AND START-UP CONTROL IN A PMBDCM OR TWO-PHASE SRM DRIVE SYSTEM

(75) Inventor: Krishnan Ramu, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 0 days.

(21) Appl. No.: 10/996,065

(22) Filed: Nov. 24, 2004

(65) Prior Publication Data

US 2005/0116679 A1 Jun. 2, 2005

Related U.S. Application Data

(63) Continuation of application No. PCT/US03/16630, filed on May 27, 2003.

(60) Provisional application No. 60/382,608, filed on May 24, 2002, provisional application No. 60/382,609, filed on May 24, 2002, provisional application No. 60/382,610, filed on May 24, 2002.

(51) Int. Cl.
*H02P 1/46* (2006.01)
*H02P 3/18* (2006.01)
*H02P 6/00* (2006.01)
*H02P 23/00* (2006.01)
*H02P 25/00* (2006.01)

(52) U.S. Cl. .................... 318/700; 318/701; 318/720; 318/724

(58) Field of Classification Search ............. None
See application file for complete search history.

(56) References Cited

U.S. PATENT DOCUMENTS

| | | | |
|---|---|---|---|
| 4,500,824 A | | 2/1985 | Miller |
| 4,684,867 A | | 8/1987 | Miller et al. |
| 5,500,579 A | * | 3/1996 | Kim et al. ............... 318/493 |
| 5,563,487 A | * | 10/1996 | Davis ..................... 318/701 |
| 5,705,918 A | * | 1/1998 | Davis ..................... 322/94 |
| 6,140,729 A | * | 10/2000 | Pollock et al. ............ 310/166 |
| 6,166,500 A | * | 12/2000 | Makaran .................. 318/254 |
| 6,469,476 B1 | * | 10/2002 | Barrett et al. ............. 322/29 |
| 6,867,561 B1 | * | 3/2005 | Pollock et al. ............ 318/254 |

* cited by examiner

*Primary Examiner*—Erick Glass
(74) *Attorney, Agent, or Firm*—Dickinson Wright, PLLC

(57) ABSTRACT

A power converter for a switched reluctance motor (SRM) or a permanent magnet brushless direct current (do) motor (PMBDCM) may include a front-end boost partial circuit for connecting with a first phase winding of the motor to form a front-end boost circuit and a back-end boost partial circuit for connecting with a second phase winding of the motor to form a back-end boost circuit. The front-end boost partial circuit generates a first step-up voltage in cooperation with the inductance provided by the first phase winding. The back-end boost partial circuit generates a second step-up voltage in cooperation with the inductance provided by the second phase winding.

64 Claims, 29 Drawing Sheets

APPARATUS FOR DRIVE CONTROL, POWER CONVERSION, AND START-UP CONTROL IN A PMBDCM OR TWO-PHASE SRM DRIVE SYSTEM

CROSS-REFERENCE TO RELATED APPLICATIONS

This is a continuation of PCT/US03/16630 filed May 27, 2003, which is based on provisional applications 60/382,608, 60/382,609, and 60/382,610 all filed on Nov. 24, 2002.

This application claims priority to U.S. Provisional Application Nos. 60/382,608, 60/382,609, and 60/382,610. Additionally, the application hereby incorporates by reference the disclosures provided in Applicant's co-pending PCT International Applications, having and filed on the same date herewith.

BACKGROUND OF THE INVENTION

1. Field of the Invention

The invention relates to an apparatus for drive control, power conversion, and start-up control in a PMBDCM or a two-phase SRM drive system.

2. Description of Related Art

Variable speed motor drives are expected to play an increasingly important role in improving home appliances particularly in their ability to meet existing and proposed federal efficiency requirements. In such motor drives, cost reduction is important. Cost reductions can come from one or more subsystems, i.e., the motor, power converter, and controller. Of all existing motor drive systems, switched reluctance machines (SRMs) offer the greatest potential for cost reduction in their subsystems, and the power converter is the primary subsystem where cost can be substantially reduced. Following is a brief description of related art power converter topologies for a two-phase SRM.

FIG. 1 illustrates a related art asymmetric power converter for driving a two-phase SRM. Power converter 100 has two controllable and two uncontrollable power devices for each phase winding 101, 102 of the SRM. Therefore, four controllable 103-106 and four uncontrollable 107-110 power devices are required for power converter 100 to operate. The primary advantage of power converter 100 is that it gives full controllability in terms of its ability to apply full positive or negative direct current (dc) link voltage and, therefore, does not diminish or restrict any operating mode of the SRM. The disadvantage of this power converter topology is that it uses eight power devices. A more detailed description of power converter 100's circuit operation may be found in "Switched Reluctance Motor Drives", R. Krishnan, CRC Press, June 2001.

FIG. 2 illustrates a related art single switch-per-phase power converter for driving a two-phase SRM. Power converter 200's circuit topology is based on splitting a dc input source voltage 201 equally to the machine side power converter. This results in a circuit requiring one controllable and one uncontrollable power device per phase winding 202, 203. Therefore, overall, power converter 200 requires two controllable power devices 204, 205 and two uncontrollable power devices 206, 207 for a two-phase SRM. The major advantage of this circuit design is that it uses a reduced number of power devices (e.g., a total of four) compared to the asymmetric converter. The disadvantage of this circuit is that it reduces the available dc source voltage by half and, therefore, doubles the current rating required for the devices and for the machine, resulting in low efficiency machine operation. A fuller description of this circuit may also be found in "Switched Reluctance Motor Drives", R. Krishnan, CRC Press, June 2001.

FIG. 3 illustrates a related art C-Dump power converter for driving a two-phase SRM. Power converter 300's circuit uses three controllable power devices 301-303 and three uncontrollable diodes 304-306, resulting in the use of six power devices. This is an intermediate circuit between those illustrated in FIGS. 1 and 2. The operating modes are somewhat restricted for this circuit, since it can apply full dc source voltage 309 to machine windings 307, 308 only in the positive direction. Furthermore, this circuit requires an external inductor 310 or a resistor (not shown) to dissipate the energy stored in C-dump capacitor 311. Use of external inductor 310 increases the cost, whereas the use of the power resistor (not shown) will result in a lower efficiency of the system and higher package volume, due to increased thermal considerations. Therefore, this circuit is not ideal for use with two-phase SRMs. A more detailed description of this circuit may be found in "Switched Reluctance Motor Drives", R. Krishnan, CRC Press, June 2001 and in Miller et al., U.S. Pat. No. 4,684,867, published in Aug. 4, 1987.

FIG. 4 illustrates a related art single switch-per-phase power converter for driving a two-phase SRM. Power converter 400 requires one uncontrolled 401, 402 and one controlled power device 403, 404 per phase 405, 406, and therefore, requires four power devices to function. Furthermore, power converter 400 requires a special winding in the machine, known as a bifilar winding. This special winding increases the copper volume in the machine windings, resulting in increased cost for the machine. Additionally, power switches 403, 404 experience higher voltage stresses due to the leakage inductance between the windings of the respective phase. This leakage inductance can be minimized but cannot be eliminated in a practical machine. Therefore, this converter circuit is not widely used, despite the fact that a full dc source voltage 407 can be impressed on the machine with full controllability of the current. A more in depth description of this circuit may be found in "Switched Reluctance Motor Drives", R. Krishnan, CRC Press, June 2001 and in Miller, U.S. Pat. No. 4,500,824, published Feb. 19, 1985.

All other power converter circuit topologies fall into one of the above-described categories, in terms of the total number of power devices required for their operation. From the foregoing, it may be seen that a minimum of four power devices are required for operating a related art two-phase SRM.

Generally speaking though, commercial power converters used to drive a two-phase SRM usually have more than two controllable switches and more than two diodes. Circuits requiring only two controllable switches and two diodes have the disadvantages of high power loss, low efficiency, and sometimes a bifilar winding in the machine, thereby reducing the power density of the machine. Therefore, existing solutions are not attractive with regard to considerations of high efficiency operation, full range of speed control, compactness in the converter's packaging and, most importantly of all, the overall cost of the system.

The fundamental challenge in power converter development has been to reduce the number of power devices, both controllable and uncontrollable, to a level corresponding to that of a single-quadrant chopper drive, such as is commonly used in a dc motor drive or in a universal motor drive. A description of these drives is provided in "Switched Reluctance Motor Drives", R. Krishnan, CRC Press, June 2001. When the number of power devices has been reduced to this level, a brushless SRM drive becomes commercially competitive for variable speed applications. Moreover, the brushless SRM has the superior advantage of high efficiency, since there are no brushes and commutators in the SRM. Also, the brushless SRM is further endowed with high-speed operability, high reliability, maintenance-free operation, greater overload capability and, most of all, a cost advantage over the dc motor drive.

All reference material cited herein is hereby incorporated into this disclosure by reference.

SUMMARY OF THE INVENTION

The invention is drawn to converter topologies for multiple-phase switched reluctance motor (SRM) and permanent magnet brushless direct current (dc) motor (PMBDCM) dive systems having one controllable switch and one diode per phase winding. These converter topologies employ buck, boost, and buck-boost circuits. Supplemental descriptions of buck, boost and buck-boost circuits and their operation may be found in any standard textbook on power electronics, such as "Power Electronics: Converters, Applications and Design," N. Mohan, T. M. Undeland, and W. P. Robbins, John Wiley and Sons, 1989.

Related art buck, boost, or buck-boost dc converters require an external inductor to operate. When these related art dc converters are employed for motor drive applications to provide variable speed drive systems, they still require inductors for their operation. The present invention employs the inductance of the motors' phase windings to operate the buck, boost, or buck-boost converters and provide energy conversion, instead of relying on the inductance provided by external inductors.

The present invention overcomes the disadvantages of related art power converters by using a circuit topology having one controllable switch and one diode (e.g., a fast switching diode) or optionally two diodes (e.g., one fast switching and the other slow). In reducing the number of controllable switches to one and the diode to one, the power converter's component and assembly costs are necessarily lower than those of all other available topologies.

Therefore, an object of the present invention is to overcome the shortcomings and problems encountered in related art devices.

Another object of the invention is to reduce the number of power devices required for a power converter.

Still another object of the invention is to provide a highly efficient power converter.

A further object of the invention is to provide a power converter having a full range of speed control.

A further object of the invention is to reduce the size of a power converter's packaging.

A further object of the invention is to reduce the overall cost of a brushless dc motor drive.

The objects of the present invention may be achieved in whole or in part by a power converter for a switched reluctance motor (SRM) or a permanent magnet brushless direct current (dc) motor (PMBDCM) having a front-end boost partial circuit for connecting with a first phase winding of the motor to form a front-end boost circuit and a back-end boost partial circuit for connecting with a second phase winding of the motor to form a back-end boost circuit. The front-end boost partial circuit generates a first step-up voltage in cooperation with the inductance provided by the first phase winding, and the back-end boost partial circuit generates a second step-up voltage in cooperation with the inductance provided by the second phase winding.

The objects of the present invention may be further achieved in whole or in part by a power converter for an SRM or a PMBDCM having a boost partial circuit for connecting with a first phase winding of the motor to form a boost circuit and a buck partial circuit for connecting with a second phase winding of the motor to form a buck circuit. The boost partial circuit generates a step-up voltage in cooperation with an inductance provided by the first phase winding, and the buck partial circuit generates a step-down voltage in cooperation with an inductance provided by the second phase winding.

The objects of the present invention may be further achieved in whole or in part by a power converter for an SRM or a PMBDCM having a boost partial circuit for connecting with a first phase winding of the motor to form a boost circuit and for connecting with a second phase winding of the motor to form a first buck circuit. Additionally, the power converter has a buck partial circuit for connecting with a third phase winding of the motor to form a second buck circuit. The boost partial circuit generates a step-up voltage in cooperation with an inductance provided by the first phase winding and generates a first step-down voltage in cooperation with an inductance provided by the second phase winding. Also, the buck partial circuit generates a second step-down voltage in cooperation with an inductance provided by the third phase winding.

The objects of the present invention may be further achieved in whole or in part by a power converter for an SRM or a PMBDCM having a front-end buck partial circuit for connecting with a first phase winding of the motor to form a front-end buck circuit and a back-end buck partial circuit for connecting with a second phase winding of the motor to form a back-end buck circuit. The front-end buck partial circuit generates a first step-down voltage in cooperation with an inductance provided by the first phase winding, and the back-end buck partial circuit generates a second step-down voltage in cooperation with an inductance provided by the second phase winding.

The objects of the present invention may be further achieved in whole or in part by a power converter for an SRM or a PMBDCM having a buck-boost partial circuit for connecting with a first phase winding of the motor to form a buck-boost circuit and a boost partial circuit for connecting with a second phase winding of the motor to form a boost circuit. The buck-boost partial circuit generates a first step-up voltage in cooperation with an inductance provided by the first phase winding and generates a step-down voltage in cooperation with the inductance provided by the first phase winding. The boost partial circuit generates a second step-up voltage in cooperation with an inductance provided by the second phase winding.

BRIEF DESCRIPTION OF THE DRAWINGS

Preferred embodiments of the present invention will now be further described in the following paragraphs of the specification and may be better understood when read in conjunction with the attached drawings, in which.

DETAILED DESCRIPTION OF THE INVENTION

Figure 1:
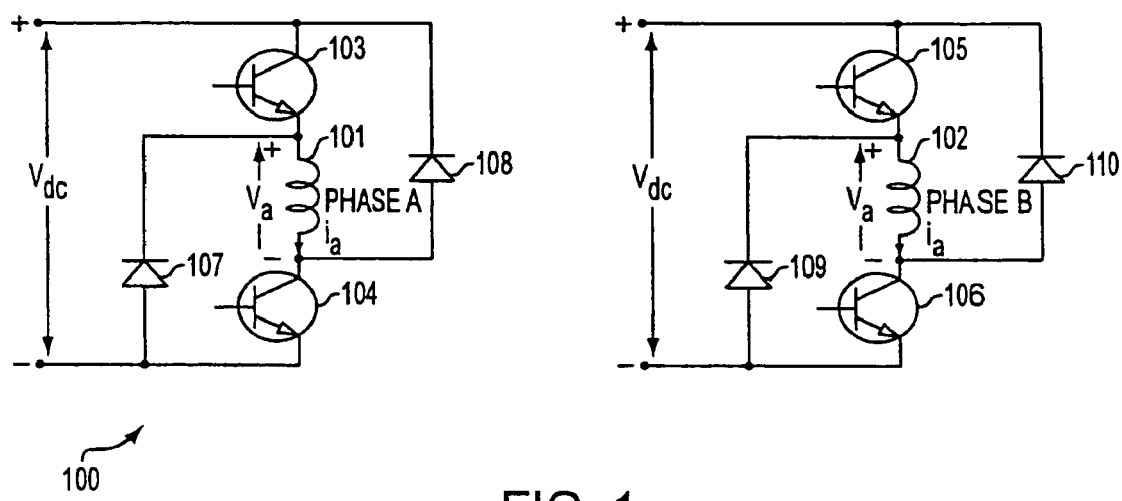
FIG. 1 illustrates a related art asymmetric power converter for driving a two-phase SRM.
Figure 2:
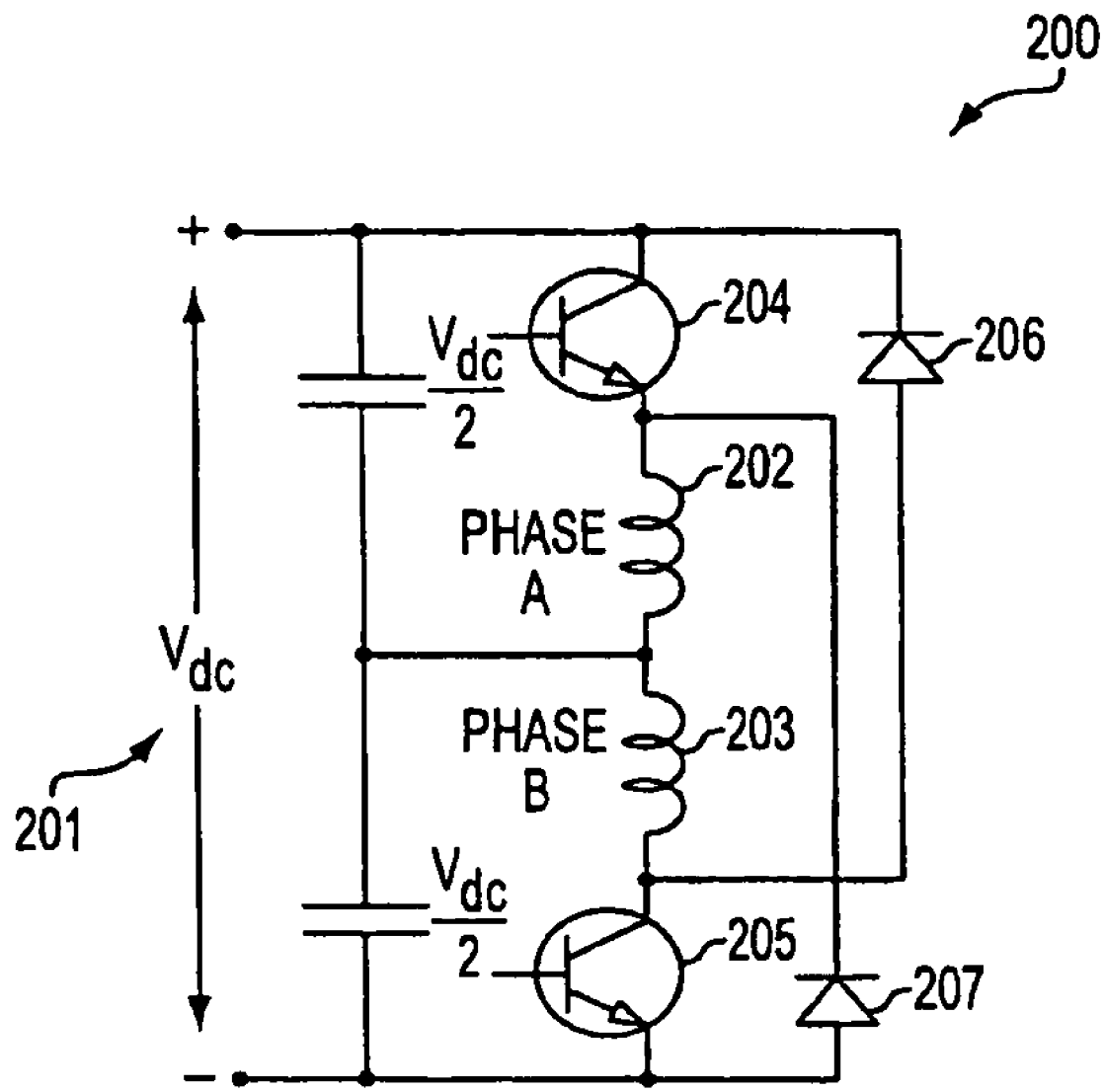
FIG. 2 illustrates a related art single switch-per-phase power converter for driving a two-phase SRM.
Figure 3:
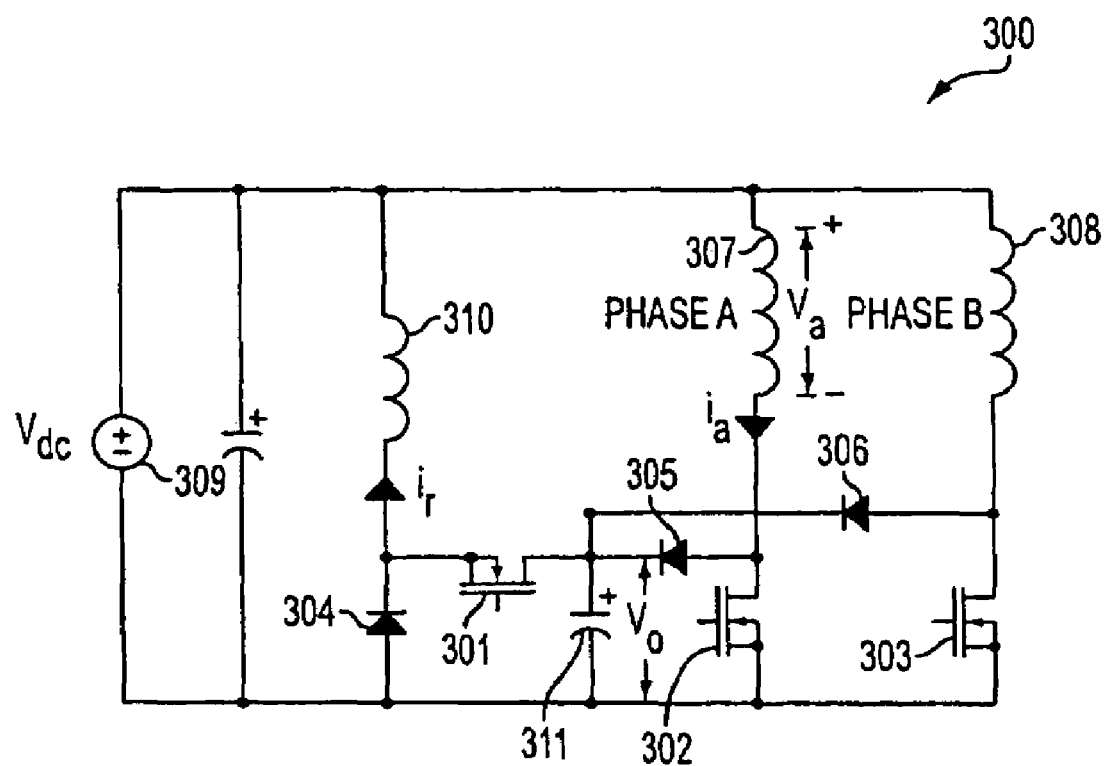
FIG. 3 illustrates a related art C-Dump power converter for driving a two-phase SRM.
Figure 4:
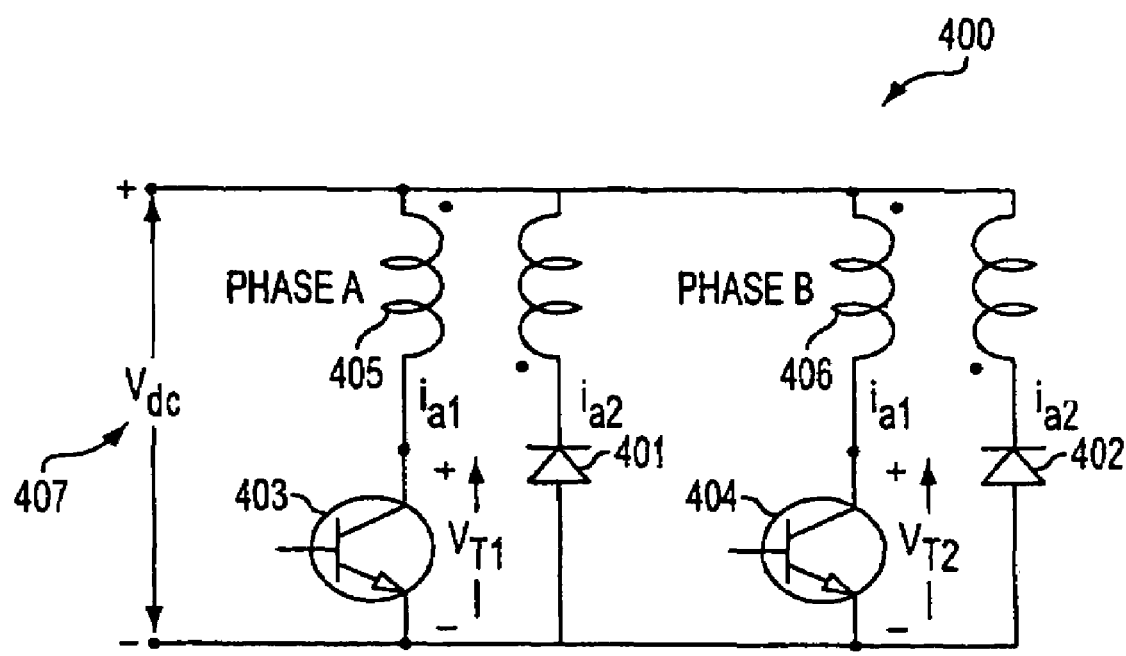
FIG. 4 illustrates a related art single switch-per-phase power converter for driving a two-phase SRM.
Figure 5A:
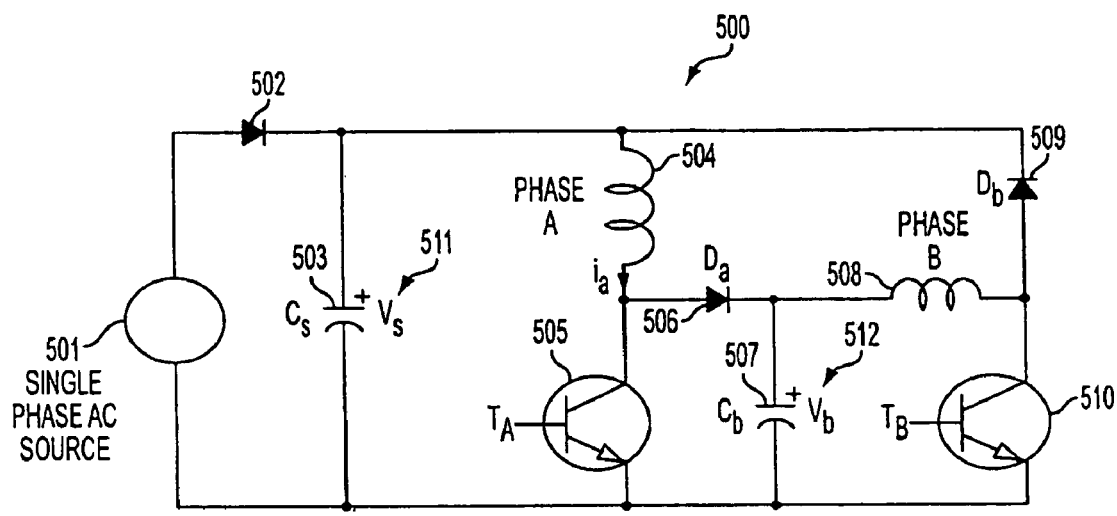
FIG. 5(a) illustrates a single controllable switch per phase power converter having a boost stage front-end and a boost stage back-end for driving a two-phase SRM or PMBDCM.

FIG. 5(a) illustrates a single controllable switch per phase power converter having a boost stage front-end and a boost stage back-end for driving a two-phase Switched Reluctance Motor (SRM) or a Permanent Magnet Brushless Direct Current Motor (PMBDCM) Power converter 500 has a front-end rectifier that may have one or four diodes, depending on the power level of the SRM drive system. For illustration, a single source rectifier diode 502 is illustrated. DC source capacitor 503 forms the dc link filter. The two windings of the two-phase SRM are shown as phase A winding 504 and phase B winding 508, with respective controllable switches of phase A transistor 505 and phase B transistor 510 and their freewheeling diodes phase A diode 506 and phase B diode 509. Intermediate capacitor 507 is the intermediate energy-storing filter for energizing phase B winding 508, which energy is obtained from the boost action of phase A transistor 505, phase A diode 506, phase A winding. 504, and intermediate capacitor 507. Note that phase A transistor 505 and phase B transistor 510 can be any one of the self commutating switches, such as a power transistor, IGBT, MOSFET, and GTO. Such a controllable power device is also referred to as a switch.

Figure 5B:
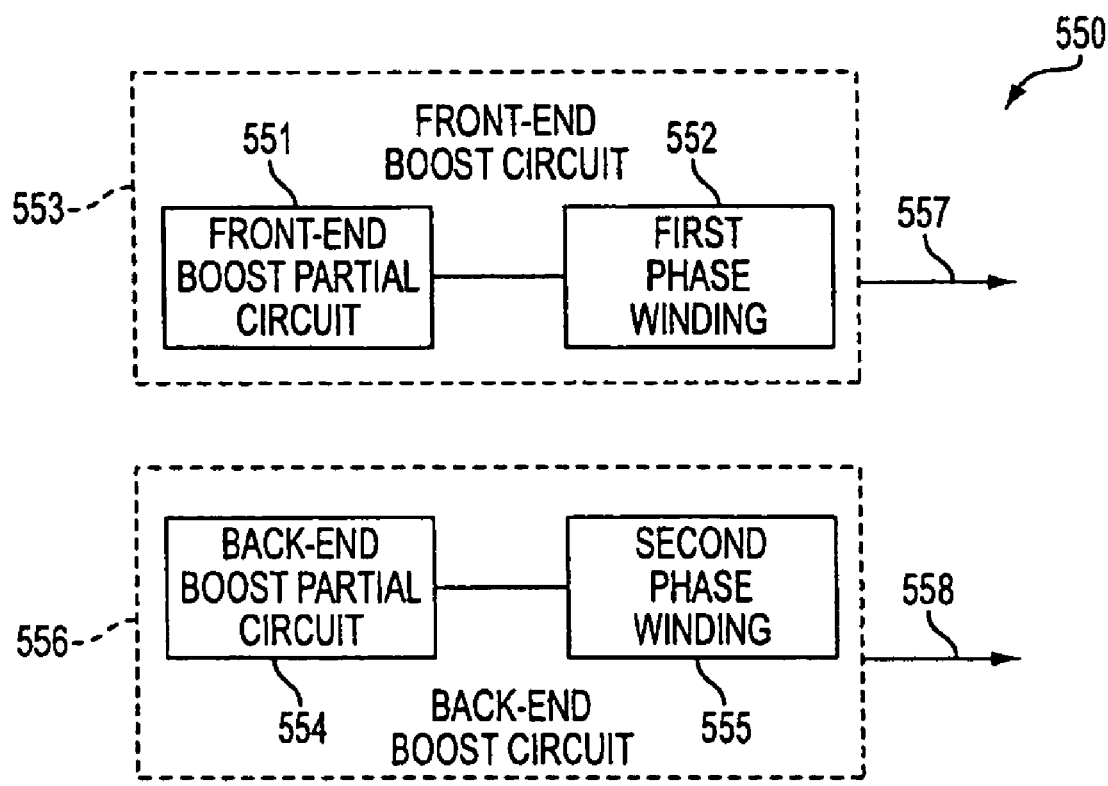
FIG. 5(b) illustrates a block diagram of a power converter, having front- and back-end boost circuits, for an SRM or PMBDCM motor.

FIG. 5(b) illustrates a block diagram of a power converter, having front- and back-end boost circuits, for an SRM or PMBDCM motor. Power converter 550 has a front-end boost partial circuit 551 that connects with a first phase winding 552 of the SRM or PMBDCM motor (not shown) to form a front-end boost circuit 553. A back-end boost partial circuit 554 connects with a second phase winding 555 of the motor to form a back-end boost circuit 556. Front-end boost partial circuit 553 generates a first step-up voltage 557 in cooperation with the inductance provided by first phase winding 552, and back-end boost partial circuit 554 generates a second step-up voltage 558 in cooperation with the inductance provided by second phase winding 555.

Figure 6:
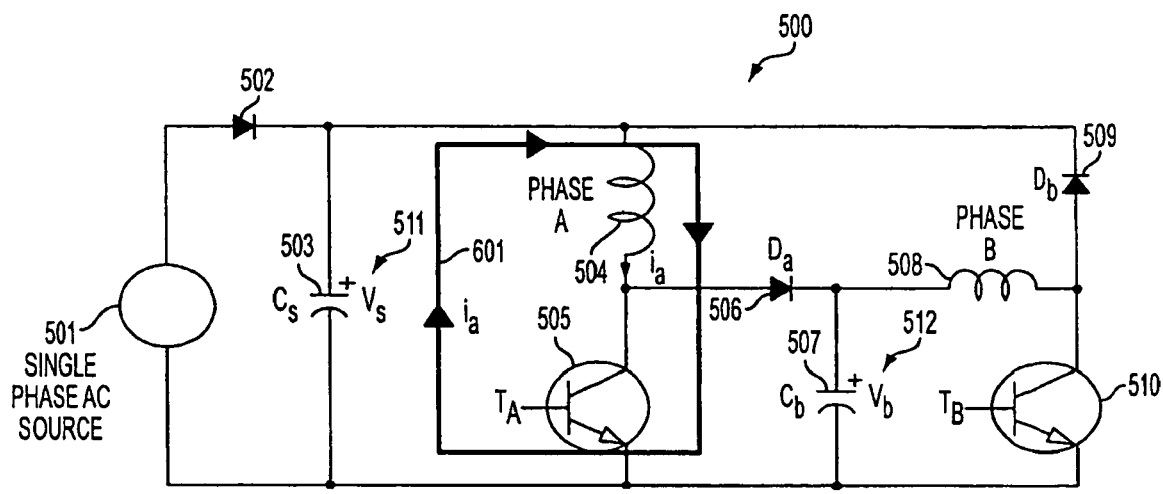
FIG. 6 illustrates the energization of the phase A winding of the power converter illustrated by FIG. 5(a)

FIG. 6 illustrates the energization of the phase A winding of the power converter illustrated by FIG. 5(a). The boost circuit, which includes phase A winding 504, provides the controlled current to phase A winding 504 and also provides the energy to operate phase B winding 508, by storing that energy in intermediate capacitor 507. This can be seen from the following.

Turning on phase A transistor 505, by gating it positively with respect to its emitter, enables it to conduct a current and thus enables the application of the source dc voltage $V_S$ 511 to phase A winding 504. This gating action results in a current 601 flowing in phase A winding 504, phase A transistor 505, dc source $V_S$ 511 and its dc source capacitor 503. This boost circuit does not require an external inductor, instead it uses phase A winding 504 for that purpose.

Figure 7:
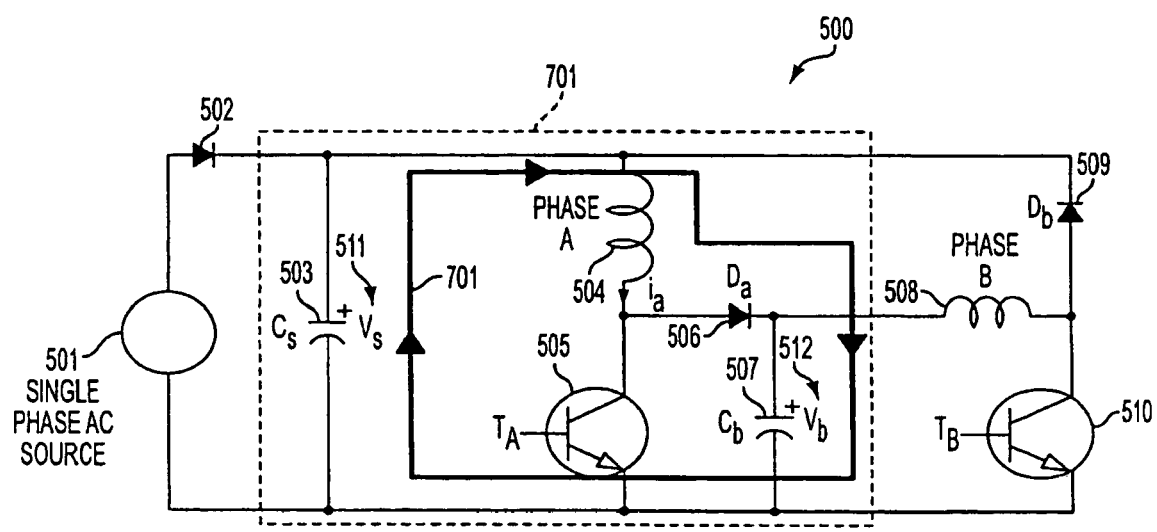
FIG. 7 illustrates the boost action of the front-end boost circuit of the power converter illustrated by FIG. 5(a)

FIG. 7 illustrates the boost action of the front-end boost circuit of the power converter illustrated by FIG. 5(a). Front-end boost circuit 701 comprises phase A transistor 505, phase A diode 506, intermediate capacitor 507, phase A winding 504, and dc source capacitor 503. If phase A transistor 505 is turned off by driving its gate signal to zero voltage, then the device stops conducting. When phase A transistor 505 is turned off, a current 701 in phase A winding 504 has to be directed to an alternative path, and this is done by dc source capacitor 503, phase A winding 504, phase A diode 506, and intermediate capacitor 507. This results in charging of intermediate capacitor 507 and transfer of energy from phase A winding 504 to intermediate capacitor 507. Note that the voltage across phase A winding 504 is $V_S$-$V_B$. Usually $V_B$ 512 is greater than source voltage $V_S$ 511. Therefore, the voltage applied across phase A winding 504 is negative, resulting in reduction of current in it and thus the current in it is commutated. From this it is seen that phase A winding 504 gets a voltage of approximately $V_S$ 511, assuming that the voltage drop across phase A transistor 505 is negligible compared to its source voltage, which it usually is. Therefore, $V_S$ 511 is applied across phase A winding 504 when phase A transistor 505 conducts, and phase A winding 504 gets a voltage of $V_S$-$V_B$ when phase A transistor 505 is turned off. Turning on and turning off phase A transistor 505 alone controls the current in phase A winding 504.

However, there is no way to apply a zero voltage across phase A winding 504. Thus, the winding experiences a higher rate of change of voltage during the turn-on and turn-off intervals, during current control operation, compared to circuits that can provide zero voltage across the winding. Even though $V_B$ 512 becomes larger than source voltage $V_S$ 511, it is not a problem to make the current from phase A winding 504 charge intermediate capacitor 507, as the current has no other path when phase A transistor 505 is turned off.

A higher voltage across intermediate capacitor 507, which serves as the input voltage to phase B winding 508, is beneficial. Higher voltage can force a current faster into phase B winding 508, and hence, will result in the finer control of current as well as torque. Partial energy from phase A winding 504 is transferred to intermediate capacitor 507, and the resulting voltage across it will be higher than source voltage $V_S$ 511, because it is a boost action.

Figure 8:
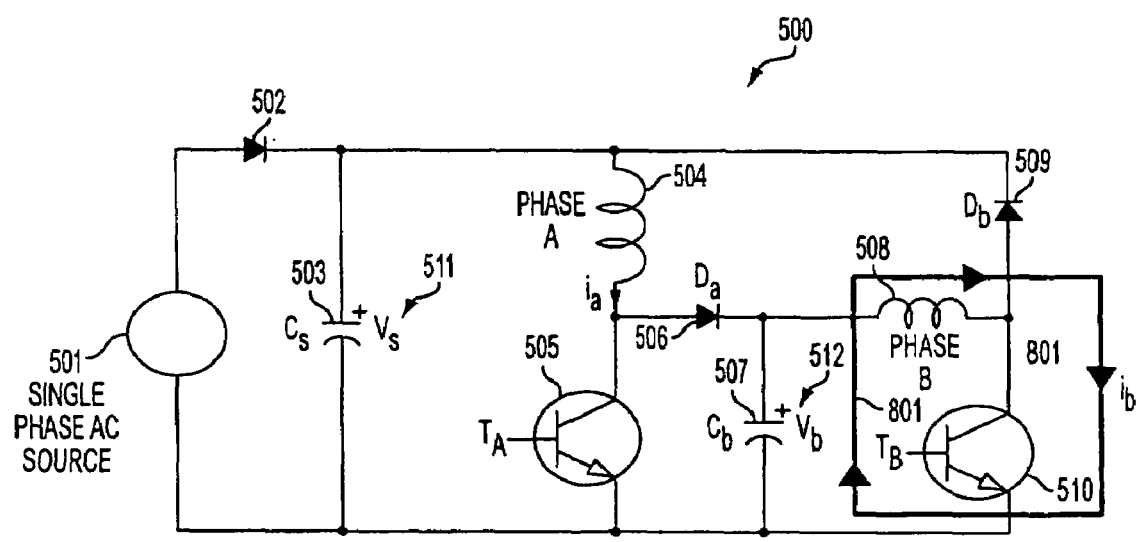
FIG. 8 illustrates the energization of the phase B winding of the power converter illustrated by FIG. 5(a)

FIG. 8 illustrates the energization of the phase B winding of the power converter illustrated by FIG. 5(a). A back-end boost circuit of power converter 500 comprises phase B winding 508 as the inductor, controllable phase B transistor 510, phase B diode 509, dc source capacitor 503, and intermediate capacitor 507. DC source capacitor 503 and intermediate capacitor 507 are input and output filters, respectively. The duty cycle of the front-end boost circuit determines the voltage input to the second boost circuit. Energy stored in the second boost circuit's input capacitor is converted into mechanical power through phase B winding 508 and partially recycled to dc source capacitor 503, similar to the operation of phase A winding 504. Turning on phase B transistor 510 enables the application of voltage $V_B$ across phase B winding 508, thus enabling a current 801 through phase B transistor 510 and phase B winding 508.

Figure 9:
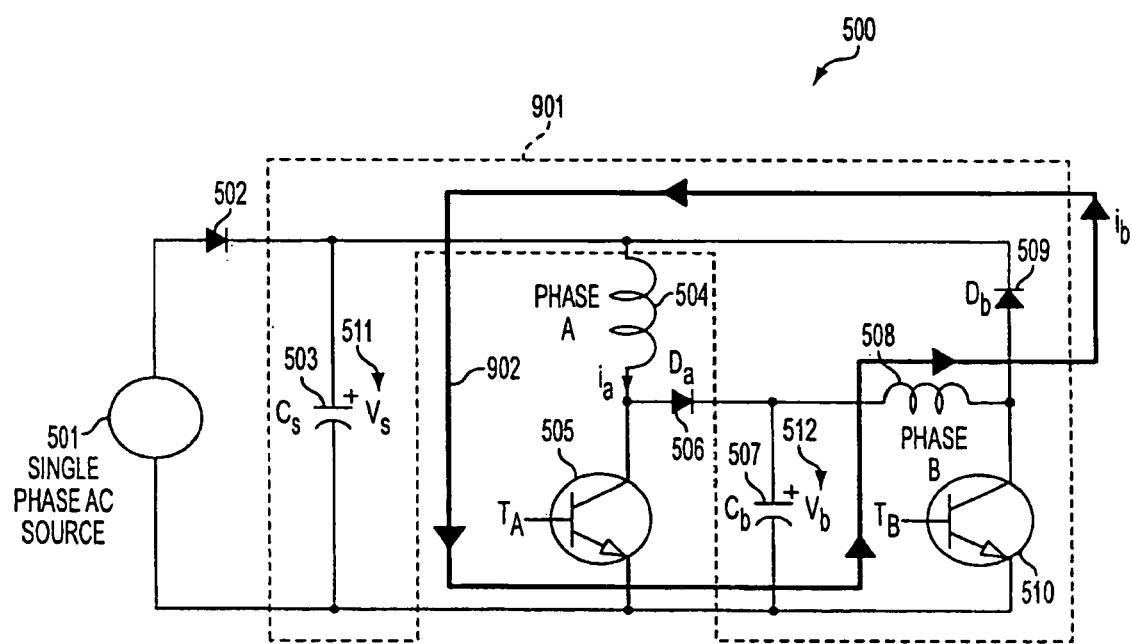
FIG. 9 illustrates the boost action of the back-end boost circuit of the power converter illustrated by FIG. 5(a)

FIG. 9 illustrates the boost action of the back-end boost circuit of the power converter illustrated by FIG. 5(a). Back-end boost circuit 901 comprises phase B transistor 510, phase B diode 509, intermediate capacitor 507, phase B winding 508, and dc source capacitor 503. Turning off phase B transistor 510 will divert a current 902 from the switch into phase B diode 509 and dc source capacitor 503, thus completing a current path through intermediate capacitor 507 and phase B winding 508. During the turn off, the voltage across phase B winding 508 is $V_B$-$V_S$. While charging dc source capacitor 503, its voltage increases and voltage across intermediate capacitor 507 decreases. This results in a negative voltage being applied across phase B winding 508. Hence, a decay of current 902 occurs in phase B winding 508 as desired.

Turning on and turning off phase B transistor 510 controls the current in phase B winding 508. Because of the boost action, part of the energy from phase B winding 508 is transferred to dc source capacitor 503. The full voltage of intermediate capacitor 507 is applied to phase B winding 508. Hence the current rise is faster and its control is finer.

Power converters 500 and 550 provide the following advantages:

1. All switch ratings are equal to a maximum of the source voltage, $V_S$ 511, or intermediate capacitor voltage, $V_B$ 512. In a related art split supply converter, with 2$V_S$ source voltage, the switch ratings are equal to 2$V_S$. Further, a single diode front end rectifier is not possible with this related art circuit, thereby limiting the choice of front end rectifiers.

2. Switching of phase B transistor 510 and phase A transistor 505 can be minimized at high speeds.

3. No external inductors are necessary.

4. The voltage rating of the capacitors is $V_S$ 511 or $V_B$ 512.

5. Intermediate capacitor 507 can be much smaller than dc source capacitor 503.

6. Shoot through proof topology.

7. The dc link input voltage is not derated, as in the case of the related art split dc supply converter, resulting in higher utilization of the voltage source and, hence, lower current in the machine phases. That is, the dc link voltage is fully utilized for powering the machine, as against some other converter topology where the applied voltage will be as low as half the dc source voltage, as in the case of the related art split phase power converter.

8. Operation with one controllable switch and diode per phase winding, without derating the dc link voltage and requiring external inductors.

9. Because of the boost action, the motor drive can operate at high speeds without sacrificing the power output that may arise in flux weakening controls of other drive systems, as higher voltage required at high speeds can be provided by the boost action of the converter.

10. Because of the boost stages, higher voltages than the source voltage can result in a faster rise of current, contributing to high dynamic response.

11. The emitters of the controllable switches are connected together. Therefore, the isolation requirement for the control circuit from the gating circuits does not exist, resulting in lower cost and compactness in packaging.

12. Because the emitters of the controllable switches are tied together, the current and voltage sensing becomes inexpensive and isolation requirements may be avoided. This leads to an inexpensive way of rotor position estimation, a feature most appreciated in low cost high volume applications.

13. This converter topology can be used for any number of odd (greater than one) or even phase SRMS.

14. This converter topology can also be used for half-wave controlled PMBDCMs with odd (greater than one) or even stator phases.

However, the voltage available for commutating phase windings A 504 and B 508 is $V_B$-$V_S$. Under low or high speed operating conditions, the available voltage may be much lower than dc source voltage $V_S$ 511. That will prolong the current conduction in these phases. Therefore, a suitable technique to advance the current commutation is desirable for the control of this converter.

Figure 10A:
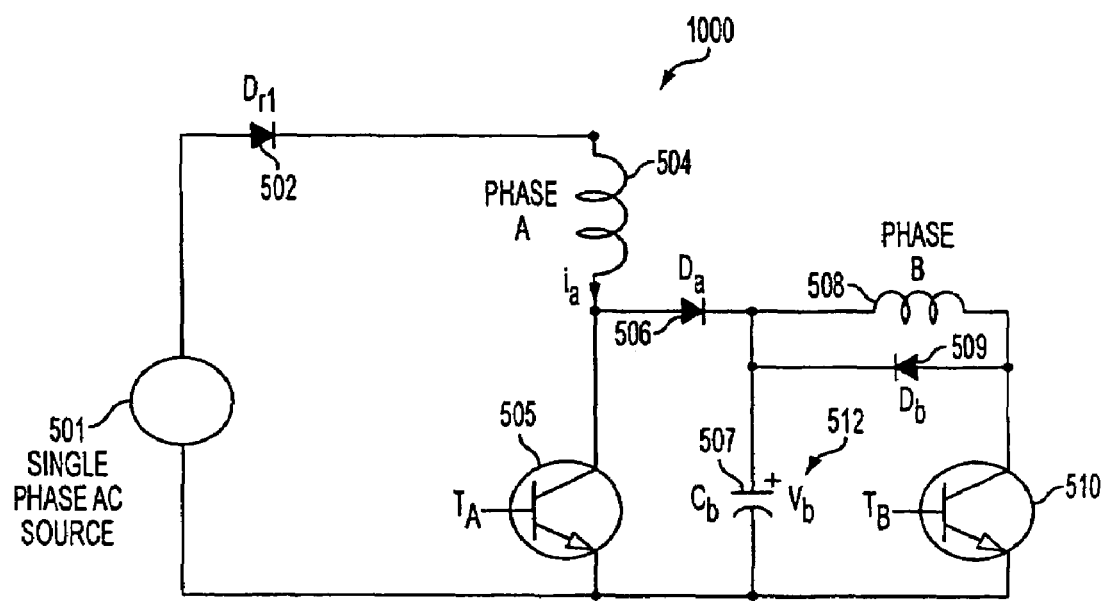
FIG. 10(a) illustrates a single controllable switch per phase power converter having a boost front-end and a buck back-end.
Figure 11:
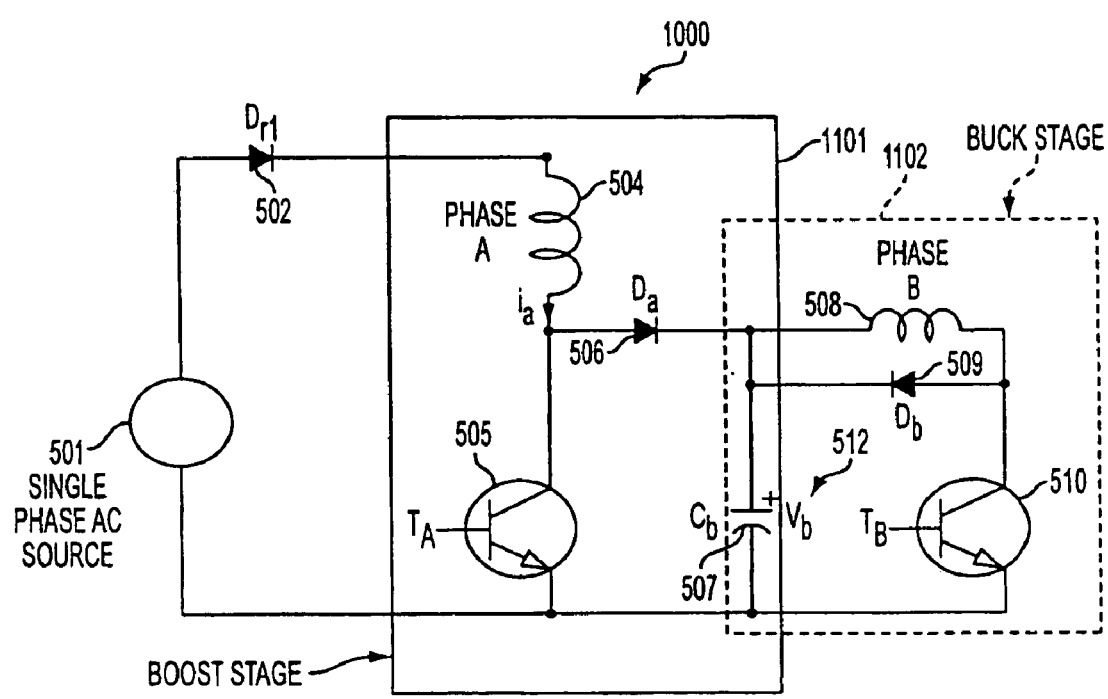
FIG. 11 illustrates the respective compositions of the boost and buck stages of the power converter illustrated by FIG. 10(a)

FIG. 10(a) illustrates a single controllable switch per phase power converter having a boost front-end and a buck back-end. FIG. 11 illustrates the respective compositions of the boost and buck stages of the power converter illustrated by FIG. 10(a). Boost stage 1101 includes phase A winding 504, phase A transistor 505, phase A diode 506, and intermediate capacitor 507. Buck stage 1102 includes phase B winding 508, phase B transistor 510, phase B diode 509, and intermediate capacitor 507. Power converter 1000 is fed with single source rectifier diode 502, which rectifies ac source 501.

Figure 10B:
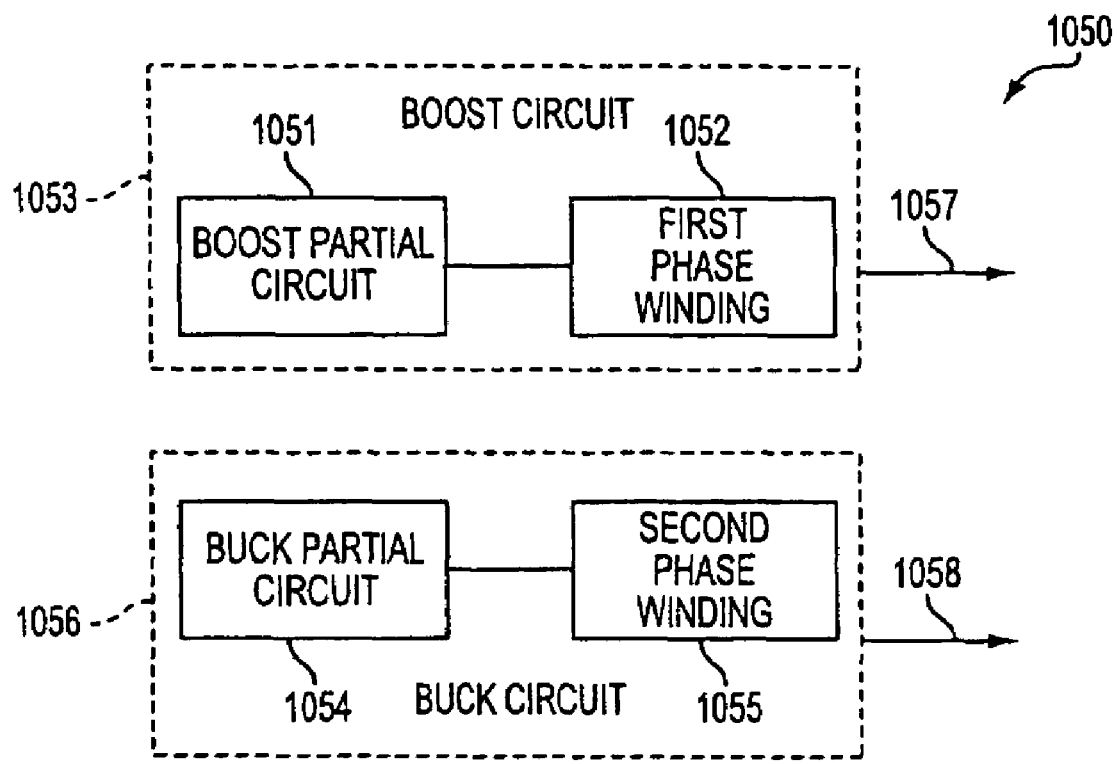
FIG. 10(b) illustrates a block diagram of a power converter, having boost and buck circuits, for an SRM or PMBDCM motor.

FIG. 10(b) illustrates a block diagram of a power converter, having boost and buck circuits, for an SRM or PMBDCM motor. Power converter 1050 has a boost partial circuit 1051 that connects with a first phase winding 1052 of the SRM or PMBDCM motor (not shown) to form a boost circuit 1053. A buck partial circuit 1054 connects with a second phase winding 1055 of the motor to form a buck circuit 1056. Boost partial circuit 1051 generates a step-up voltage 1057 in cooperation with an inductance provided by first phase winding 1052, and buck partial circuit 1054 generates a step-down voltage 1058 in cooperation with an inductance provided by second phase winding 1055.

Figure 12:
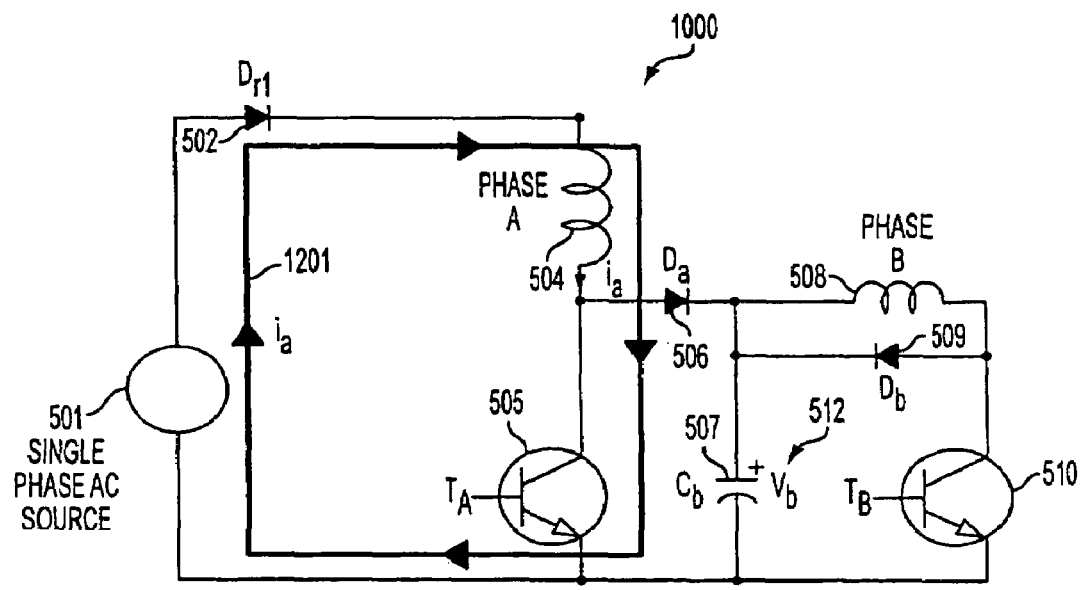
FIG. 12 illustrates the energization of the phase A winding of the power converter illustrated by FIG. 10(a)

FIG. 12 illustrates the energization of the phase A winding of the power converter illustrated by FIG. 10(a). Because of the half-wave rectification of ac source 501, phase A winding 504 is powered only during the positive half cycle of ac source 501. During the positive half-wave of ac source 501, turning on phase A transistor 505 connects phase A winding 504 across ac source 501, which enables a current 1201 to flow through phase A winding 504, phase A transistor 505, ac source 501, and source rectifier diode 502.

Figure 13:
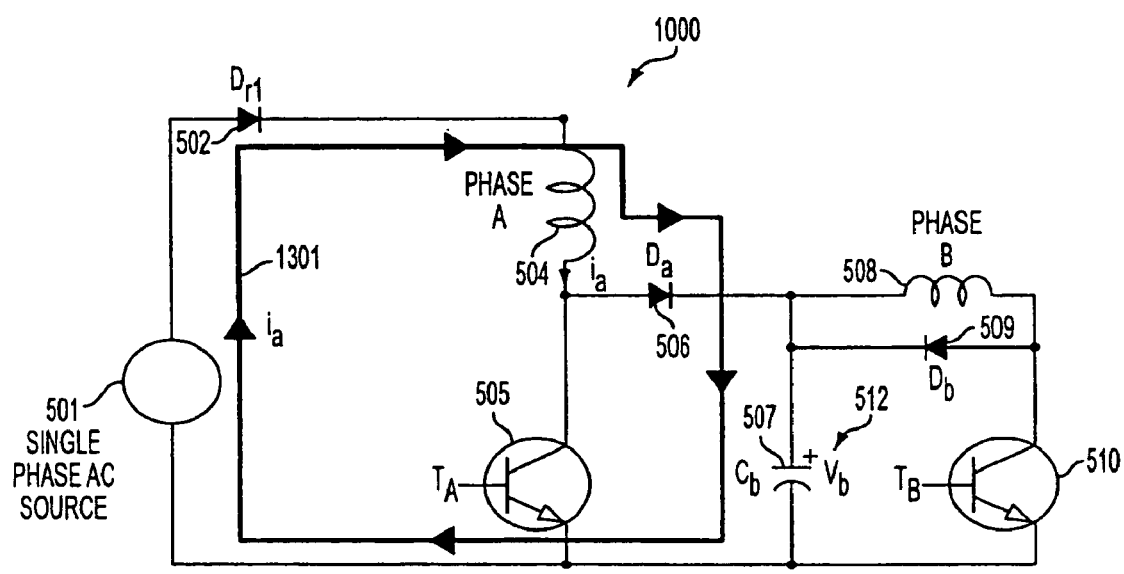
FIG. 13 illustrates the boost action of the power converter illustrated by FIG. 10(a)

FIG. 13 illustrates the boost action of the power converter illustrated by FIG. 10(a). When-phase A transistor 505 is turned off, a current 1301 is diverted from phase A transistor 505 to phase A diode 506 and intermediate capacitor 507, thus charging the capacitor via the ac source 501 and phase A winding 504. This will allow current 1301 in phase A winding 504 to decrease and decay.

Thus by turning on and off controllable phase A transistor 505, not only the current in phase A winding 504 is controlled but also the current in ac source 501 is controlled. By profiling the current control to follow a sinusoidal shape, the input current is controlled to that shape and also the power factor is controlled to unity. Both of these features are unique. However, with half-wave rectification, only positive half cycles of current in the ac supply are controlled and also phase A winding 504 is fed only during such positive half cycles. Such a drawback can be countered with a full wave rectifier in the place of source rectifier diode 502.

Figure 14:
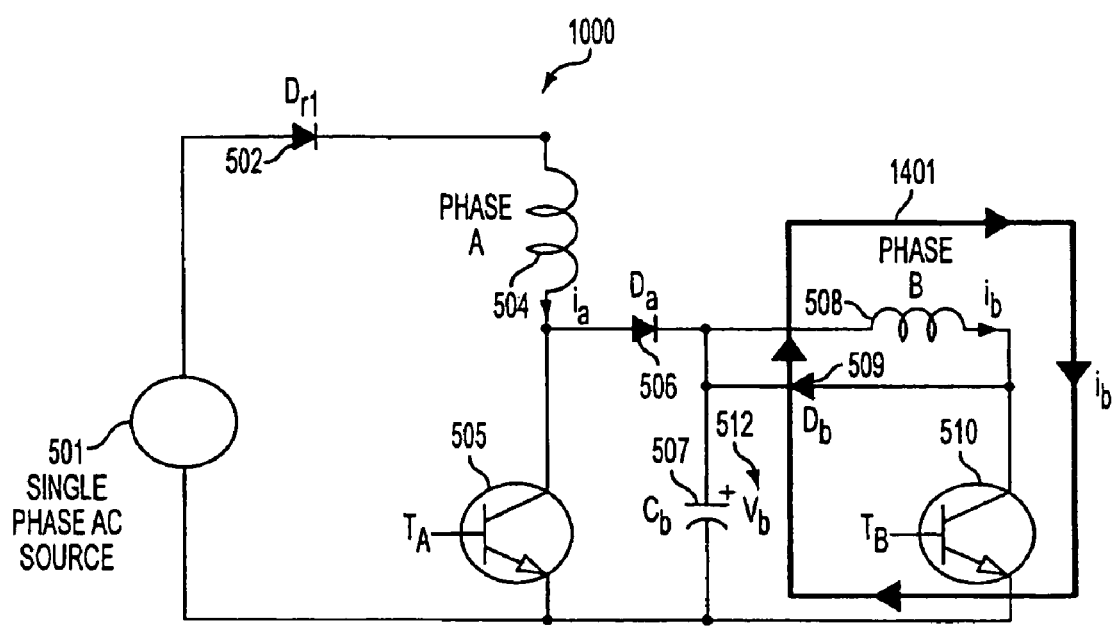
FIG. 14 illustrates the buck stage energization of the power converter illustrated by FIG. 10(a)

FIG. 14 illustrates the buck stage energization of the power converter illustrated by FIG. 10(a). Intermediate capacitor 507 is charged both through controllable action of phase A transistor 505 as well as when it is not activated. Therefore, there is energy stored in intermediate capacitor 507 for powering phase B winding 508. The energization of phase B winding 508 is done by turning on phase B transistor 510, which closes a circuit comprising intermediate capacitor 507, phase B winding 508, and phase B transistor 510. This enables a current 1401 in phase B winding 508.

Figure 15:
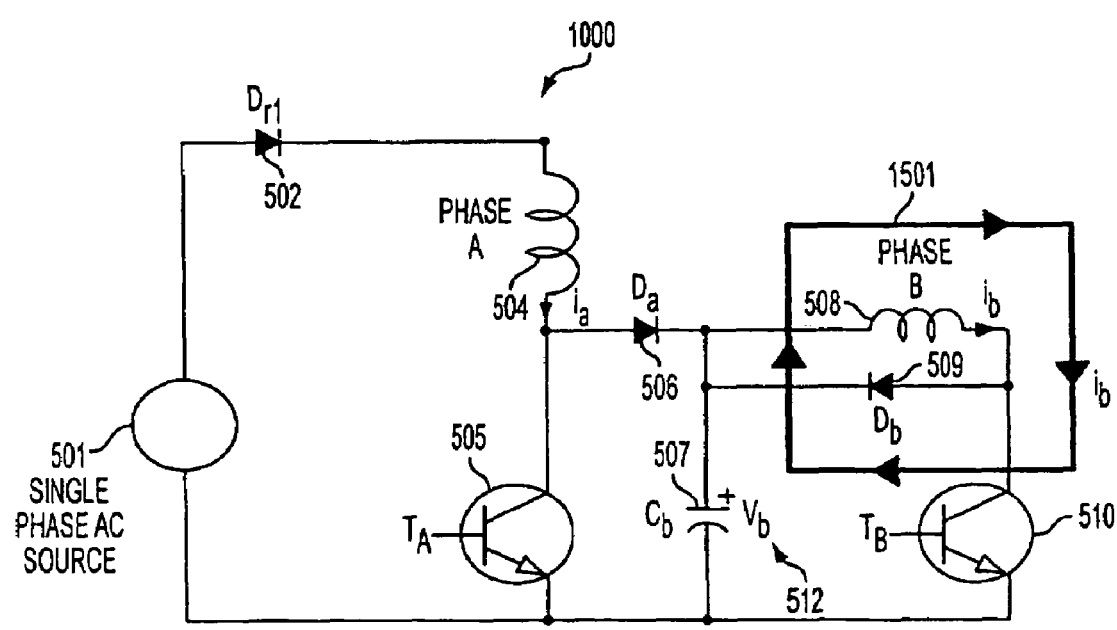
FIG. 15 illustrates the buck stage freewheeling for the power converter illustrated by FIG. 10(a)

FIG. 15 illustrates the buck stage freewheeling for the power converter illustrated by FIG. 10(a). When the current has to be turned off or controlled, phase B transistor 510 is turned off. That lets a current 1501 path comprising phase B winding 508 and phase B diode 509 come into play. This is known as freewheeling and the voltage across phase B winding 508 is almost zero, assuming that the diode is ideal and its voltage drop can be neglected. This forces current 1501 to decay and finally come to zero.

Power converters 1000 and 1050 provide the following advantages:

1. It is single capacitor based.
2. One controllable switch and one diode per phase.
3. Rectification is simple with one diode.
4. Least number of components for a two phase SRM drive.
5. Concept is extendable to any number of phases. For example, a three-phase machine can have two boost stages and one buck stage, or vice versa. A four-phase machine can have two boost power stages and two buck power stages, all using only one capacitor.
6. Input current shaping and unity power factor operation are endowed.
7. Both controllable switch emitters are tied together, resulting in greater simplicity in gating circuitry and having no necessity for isolation of the gating and control circuits for low cost applications.
8. The buck and boost power converter stages require no external inductors and they use the machine windings themselves for their power conversion.

However, slower current decay in phase B winding 508 may occur due to freewheeling. Therefore, care is exercised in the control of phase B winding 508, through programming an advance turn off to avoid this problem. Also, since half-wave current control is used on the ac side, there is half-time control and energization of phase A winding 504. Both of these drawbacks can be solved by introducing a full-wave rectifier in the front end.

Figure 16:
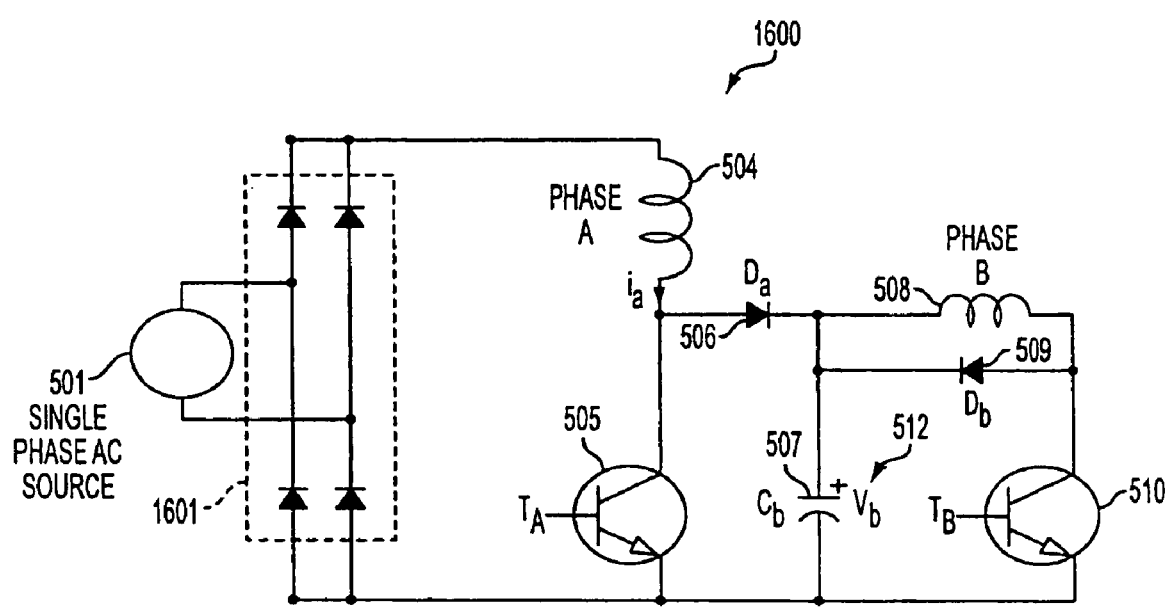
FIG. 16 illustrates the power converter of FIG. 10(a) having a full-wave rectifier at its front end.

FIG. 16 illustrates the power converter of FIG. 10(a) having a full-wave rectifier at its front end. Power converter 1600 has a full-wave front-end rectifier 1601 so that boost stage 1101 can enable a unity power factor and input current shaping to a sinusoidal waveform. Also, this provides a supply for all time available to boost stage input. Hence, phase A winding 504 is controllable at all times. Again, power converter 1600 has the same advantages as power converters 1000 and 1050, without their disadvantages.

Figure 17A:
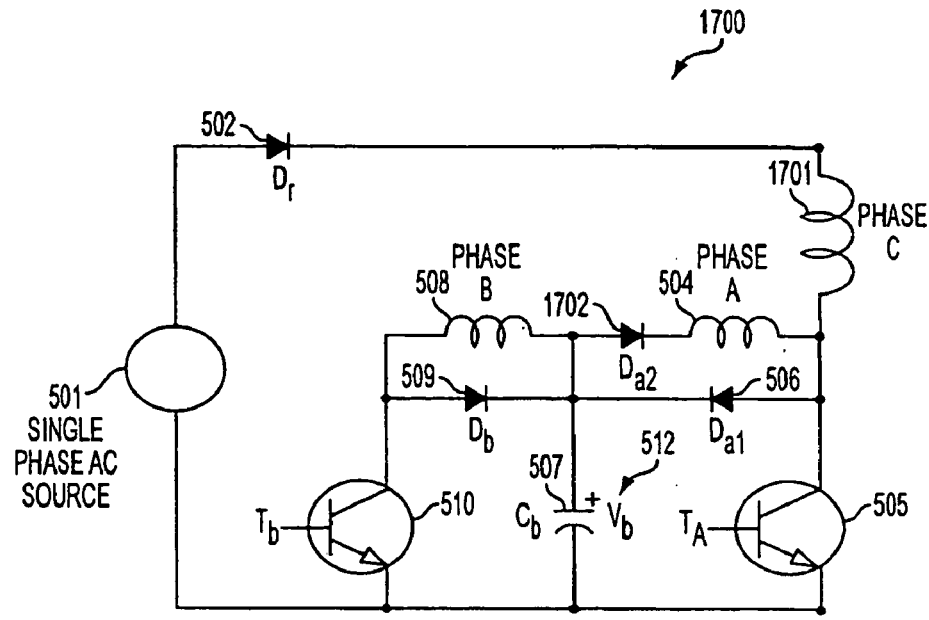
FIG. 17a illustrates a power converter having a boost front-end and a back-end with two buck stages that controls a three-phase motor with two controllable switches.
Figure 17B:
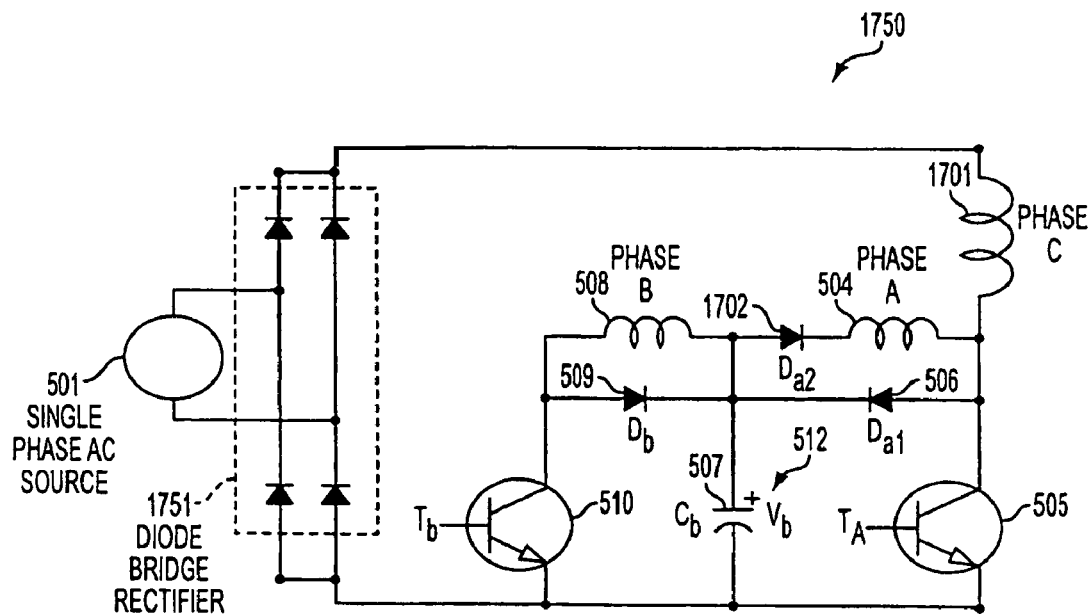
FIG. 17b illustrates the power converter of FIG. 17a having a full-wave front-end rectifier.

FIG. 17a illustrates a power converter having a boost front-end and a back-end with two buck stages that controls a three-phase motor with two controllable switches. FIG. 17b illustrates the power converter of FIG. 17a having a full-wave front-end rectifier. The fundamental invention of front-end boost and back-end buck is combined here for a three-phase SRM drive with only two controllable switches. Phase C winding 1701 and phase A winding 504 are controlled by phase A transistor 505, at the same time. Phase B transistor 510 controls only phase B winding 508.

Here also, the advantages of unity power factor operation and input current shaping are achieved for both the half-wave and full-wave rectification cases. This system endows the unique feature of two controllable switches controlling a three phase SRM.

Controlling phase A transistor 505 enables a current in phase C winding 1701 by boost energization, via ac source 501, source rectifier diode 502 or source full-wave rectifier 1751, phase C winding 1701, and phase A transistor 505. While phase C winding 1701 is being boost energized, phase A winding 504 is energized by the dc link voltage across intermediate capacitor 507 in a buck mode, via $V_B$ 512, phase A diode 1702, phase A winding 504, and phase A transistor 505. When phase A transistor 505 is turned off, phase C winding 1701 charges intermediate capacitor 507 via freewheeling diode 1703, while the current in phase A winding 504 freewheels via freewheeling diode 1703.

Phase B winding 508 is controlled by phase B transistor 510 in a buck mode from voltage source $V_B$ 512, and current is controlled or commutated by way of freewheeling phase B diode 509. Therefore, phase C winding 1701 is controlled by boost mode, while phases A and B are controlled by buck mode. This explanation is applicable to both cases of half- and full-wave rectification.

Figure 17C:
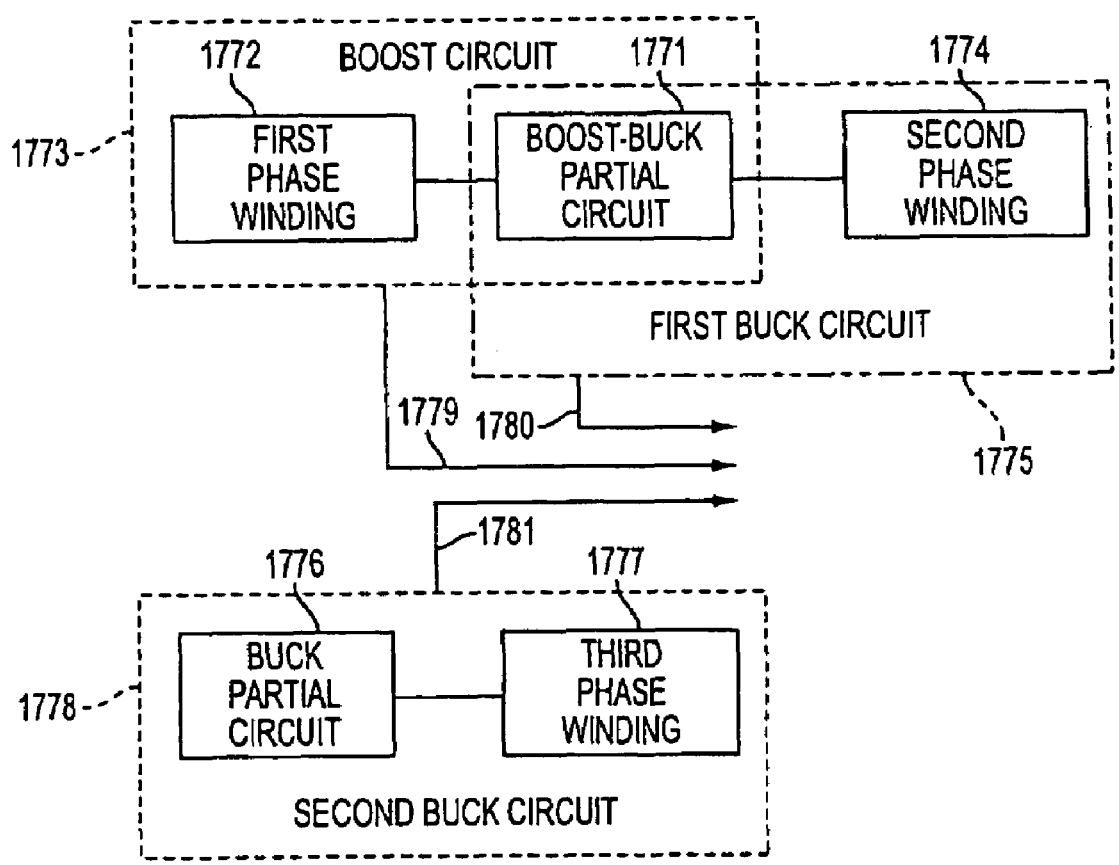
FIG. 17(c) illustrates a block diagram of a power converter, having boost-buck and buck circuits, for an SRM or PMBDCM motor.

FIG. 17(c) illustrates a block diagram of a power converter, having boost-buck and buck circuits, for an SRM or PMBDCM motor. Power converter 1770 has a boost-buck partial circuit 1771 that connects with a first phase winding 1772 of the SRM or PMBDCM motor (not shown) to form a boost circuit 1773. Boost-buck partial circuit 1771 connects with a second phase winding 1774 of the motor to form a first buck circuit 1775. Additionally, a buck partial circuit 1776 connects with a third phase winding 1777 of the motor to form a second buck circuit 1778. Boost-buck partial circuit 1771 generates a step-up voltage 1179 in cooperation with an inductance provided by first phase winding 1772 and generates a first step-down voltage 1780 in cooperation with an inductance provided by second phase winding 1774. Buck partial circuit 1776 generates a second step-down voltage 1781 in cooperation with an inductance provided by third phase winding 1777.

Power converters 1700, 1750, and 1770 provide the following advantages:

1. They have all the advantages of the original boost and buck circuit topology.
2. Only two controllable switches to control a three phase machine.

However, the overlapping control of phases A and C results in some degradation of torque generation, if careful control in the switching is not exercised. Slightly lower output is also possible in this topology.

Figure 18:
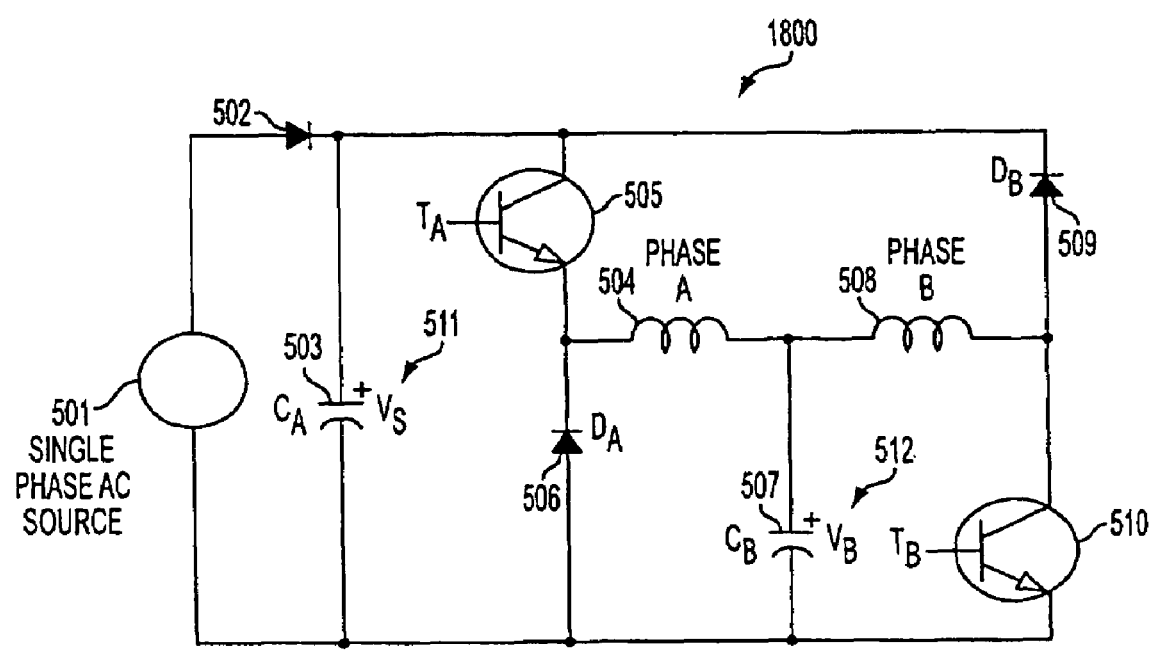
FIG. 18 illustrates a single controllable switch per phase power converter having a buck front-end and a boost back-end.
Figure 19:
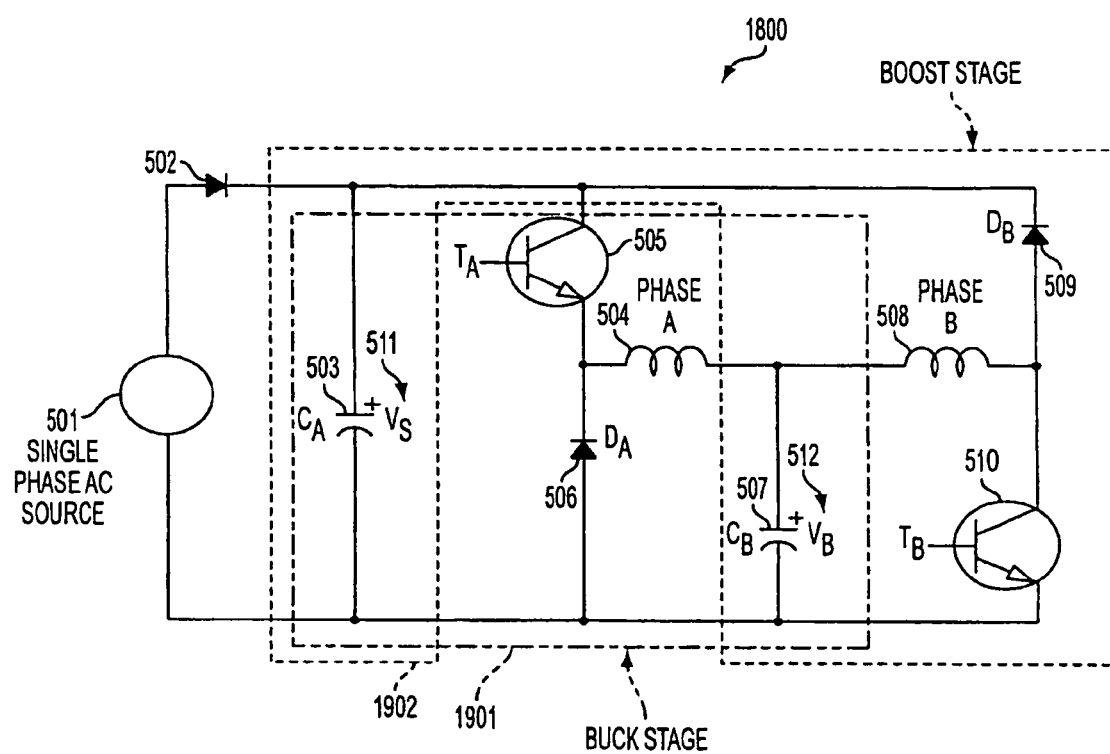
FIG. 19 illustrates the respective compositions of the boost and buck stages of the power converter illustrated by FIG. 18.

FIG. 18 illustrates a single controllable switch per phase power converter having a buck front-end and a boost back-end. FIG. 19 illustrates the respective compositions of the boost and buck stages of the power converter illustrated by FIG. 18. Power converter 1800's front-end is a buck stage power converter 1901, which means it will apply a voltage lower than that of the source voltage, and the back end is a boost stage 1902, where the input voltage is lower than that of the output voltage. Power converter 1800 converts the power from source to machine and from machine to a different source.

Buck stage 1901 includes dc source capacitor 503 and its voltage, $V_S$ 511, controllable phase A transistor 505, phase A winding 504, intermediate capacitor 507, and phase A diode 506. The front-end rectifier can be half wave or full wave. The buck action is controlled by phase A transistor 505 and its operation is similar to that described previously regarding buck stages. It provides an output voltage to intermediate capacitor 507, which serves as the input voltage to the boost stage that includes intermediate capacitor 507, phase B winding 508, controllable phase B transistor 510, phase B diode 509, and dc source capacitor 503 and the voltage across it. Phase B transistor 510 serves to control the boost action, which has been described previously. Therefore, a fully controllable two phase SRM drive is derived out of this circuit.

Power converter 1800 provides the following advantages:
1. Only one switch per phase for the two phase SRM drive.
2. Concept is applicable to any number of phases.
3. Concept is applicable to half-wave controlled PMBDCM drives and for any number of phases.
4. Independent control of phases.
5. Compact and small number of parts.

6. Because of buck front end, the voltage across its output intermediate capacitor 507 is very controlled and is a function of the operating speed of the machine, resulting in an appropriate amount of voltage for feeding phase B winding 508. Therefore, a very minimum of switching has to be performed for phase B winding 508, resulting in lower switching losses for phase B transistor 510. This improves the efficiency of the converter and, hence, the overall drive system.

Figure 20A:
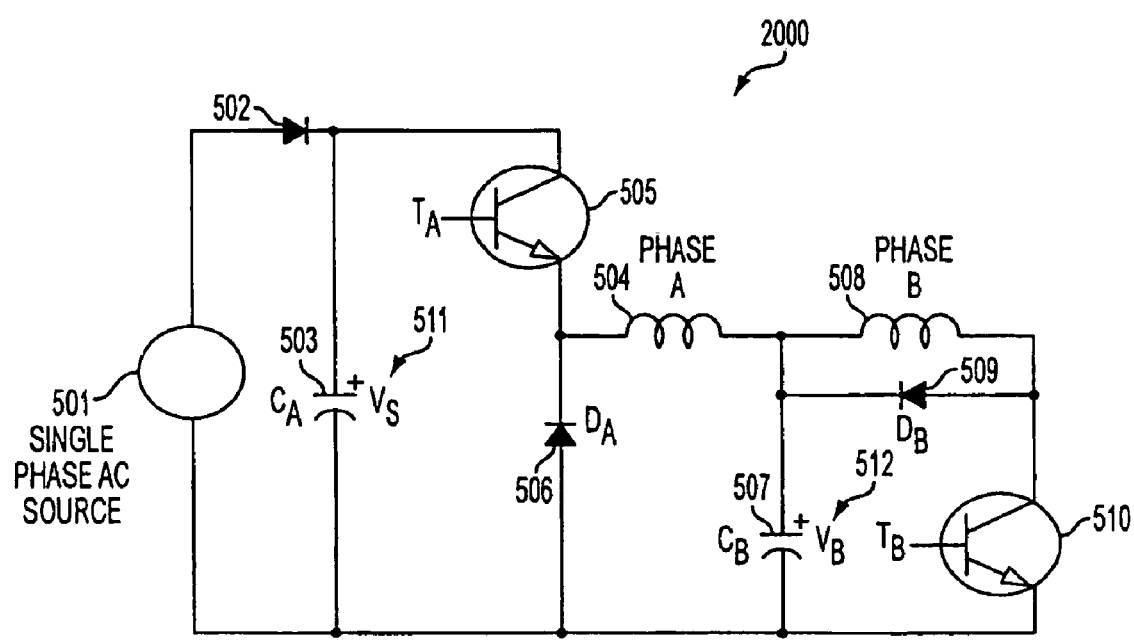
FIG. 20(a) illustrates a single controllable switch per phase power converter having a buck front-end and a buck back-end power stage.

FIG. 20(a) illustrates a single controllable switch per phase power converter having a buck front-end and a buck back-end power stage. The front-end buck stage is the same as shown in FIG. 18. The back-end buck stage includes intermediate capacitor 507, phase B winding 508, phase B transistor 510, and freewheeling phase B diode 509. The working of the back-end buck stage has been described already. Hence, a repeat of this description is skipped here for brevity.

Figure 20B:
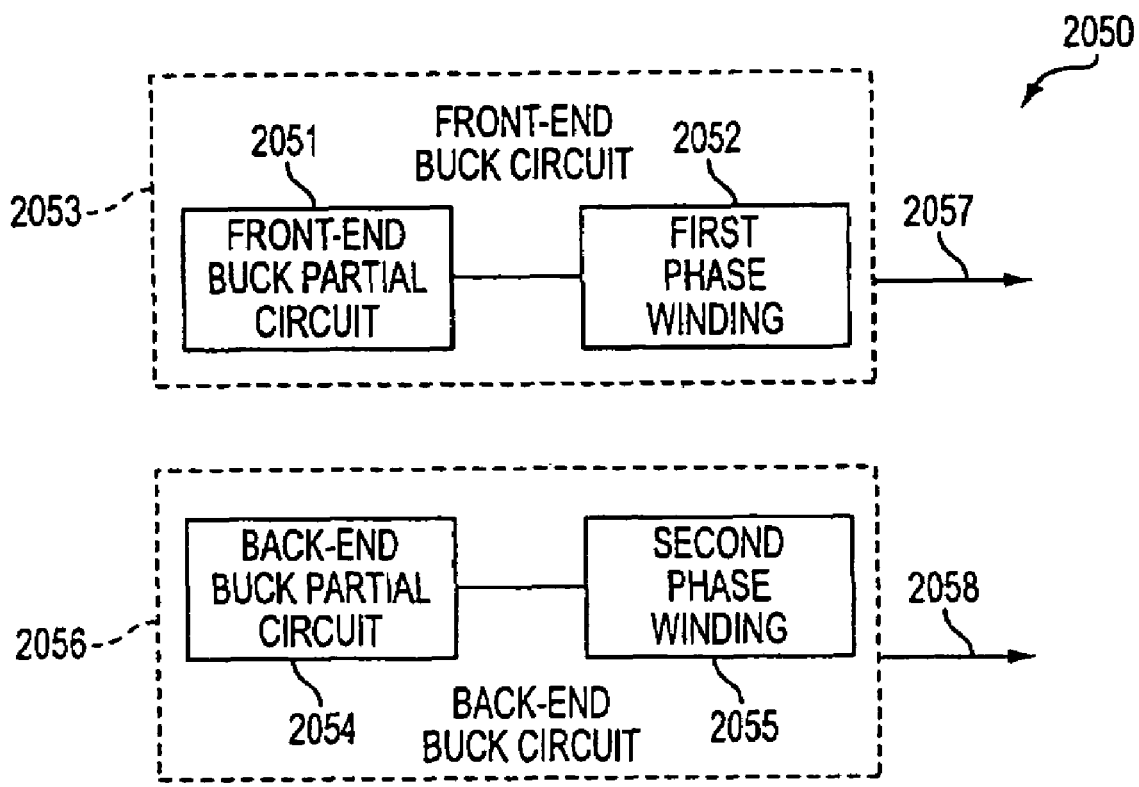
FIG. 20(b) illustrates a block diagram of a power converter, having front- and back-end buck circuits, for an SRM or PMBDCM motor.

FIG. 20(b) illustrates a block diagram of a power converter, having front- and back-end buck circuits, for an SRM or PMBDCM motor. Power converter 2000 has a front-end buck partial circuit 2051 that connects with a first phase winding 2052 of the SRM or PMBDCM motor (not shown) to form a front-end buck circuit 2053. A back-end buck partial circuit 2054 connects with a second phase winding 2055 of the motor to form a back-end buck circuit 2056. Front-end buck partial circuit 2051 generates a first step-down voltage 2057 in cooperation with an inductance provided by first phase winding 2052. Back-end buck partial circuit 2054 generates a second step-down voltage 2058 in cooperation with an inductance provided by second phase winding 2055.

Power converters 2000 and 2050 provide the following advantages:
1. Almost all the advantages of buck and boost power stage converter topology.
2. Minimum switching of phase B winding 508 and hence higher efficiency.
3. Current commutation in phase B winding 508 may be longer. Therefore, care is taken in advancing the commutation of phase B transistor 510.
4. No external inductors are used, instead the machine windings themselves are used in the buck power stages for power conversion and operation of the circuit.

Figure 21A:
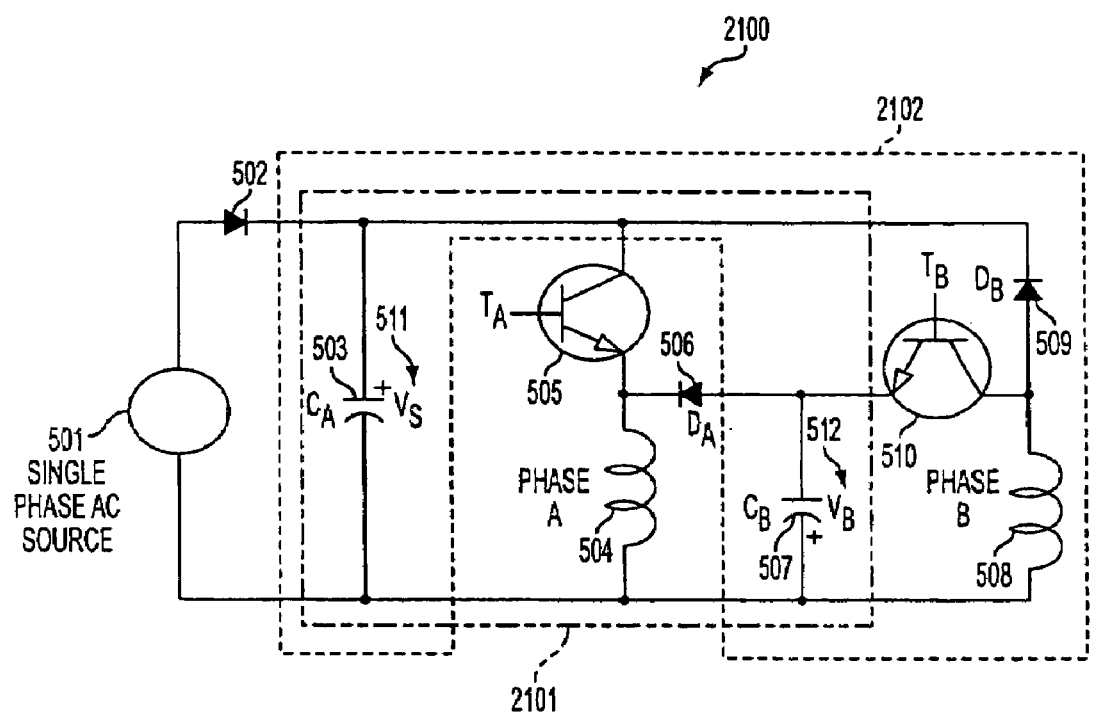
FIG. 21(a) illustrates a single controllable switch per phase power converter having a buck-boost front-end and a boost back-end power stage.

FIG. 21(a) illustrates a single controllable switch per phase power converter having a buck-boost front-end and a boost back-end power stage. Power converter 2100's front-end converter is a buck-boost stage circuit 2101 and its back end is a simple boost stage circuit 2102. For the operation of the two converter stages, they absolutely require inductors that normally are external and unrelated to the machine. The invention uses the machine windings themselves as the inductors for the operation of the converter stages.

Power converter 2000 includes a front-end rectifier that may have one or four diodes, depending on the power level of the SRM drive system. For illustration, a single source rectifier diode 502 is shown. DC source capacitor 503 forms the dc link filter. The two windings of the two-phase SRM are shown as phase A winding 504 and phase B winding 508, with respective controllable switches of phase A transistor 505 and phase B transistor 510 and their freewheeling phase A diode 506 and phase B diode 509. Intermediate capacitor 507 is the intermediate energy storing filter for energizing phase B winding 508, which energy is obtained from the buck-boost action of phase A transistor 505, phase A diode 506, phase A winding 504, and intermediate capacitor 507.

Buck-boost circuit 2101 provides controlled current to phase A winding 504 and also provides dc source voltage $V_S$ 511 to phase B winding 508. Buck-boost circuit 2101 does not require an external inductor and, instead, uses phase A winding 504 of the machine for that purpose.

Boost circuit 2102 includes phase B winding 508 as the inductor, controllable phase B transistor 510, phase B diode 509, and dc source capacitor 503 and intermediate capacitor 507 for input and output filters, respectively. The duty cycle of front-end buck-boost circuit 2101 determines the voltage input to boost circuit 2102. Energy stored in boost circuit 2102's input capacitor is converted into mechanical power through phase B winding 508 and partly recycled to dc source capacitor 503.

Figure 21B:
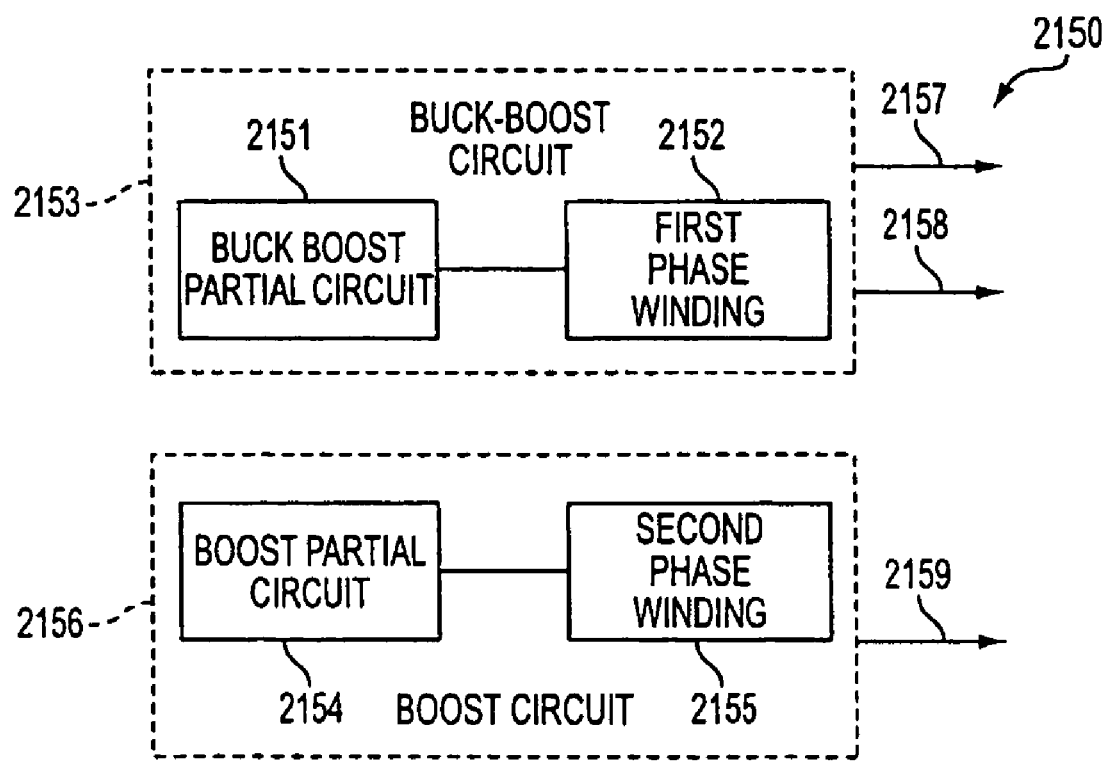
FIG. 21(b) illustrates a block diagram of a power converter, having buck-boost and boost circuits, for an SRM or PMBDCM motor.

FIG. 21(*b*) illustrates a block diagram of a power converter, having buck-boost and boost circuits, for an SRM or PMBDCM motor. Power converter 2100 has a buck-boost partial circuit 2151 that connects with a first phase winding 2152 of the SRM or PMBDCM motor (not shown) to form a buck-boost circuit 2153. A boost partial circuit 2154 connects with a second phase winding 2155 of the motor to form a boost circuit 2156. Buck-boost partial circuit 2151 generates a first step-up voltage 2157 in cooperation with an inductance provided by first phase winding 2152 and generates a step-down voltage 2158 in cooperation with the inductance provided by first phase winding 2152. Boost partial circuit 2154 generates a second step-up voltage 2159 in cooperation with an inductance provided by second phase winding 2155.

Power converters 2100 and 2150 provide the following advantages:

1. All switch ratings are equal to a maximum of the source voltage, $V_S$ 511, or $V_B$, whichever is higher. In a related art split supply converter with a $2V_S$ source voltage, the switch ratings are equal to $2V_S$. Further, a single diode front-end rectifier is not possible with this related art circuit, thereby limiting the choice of front end rectifiers.

2. Switching of phase B transistor 510 and phase A transistor 505 can be minimized at high speeds.

3. No external inductors are necessary for the operation of front-end buck-boost stage circuit 2101 and back-end boost circuit 2102 stage.

4. The voltage rating of the capacitors is $V_S$ or $V_B$, whichever is higher.

5. Intermediate capacitor 507 can be much smaller than dc source capacitor 503.

6. Shoot through proof topology.

7. The dc link input voltage is not derated as in the case of the related art split dc supply converter, resulting in higher utilization of the voltage source and hence lower current in the machine phases.

8. Power converter 2100 provides for one controllable switch and diode per phase without derating the dc link voltage and external inductors.

9. Because of boost action of both converter stages, the motor drive can operate at high speeds without sacrificing the power output that may arise in flux weakening controls of other related art drive systems, as higher voltage required at high speeds can be provided by the boost action of the converter.

10. Because of the boost stages, higher voltages than the source voltage can result in a faster rise of current, contributing to high dynamic response.

11. Below the rated or nominal speed operation of the machine, the front-end buck-boost circuit 2101 can operate in the buck mode resulting in lower switching of phase B winding 508 and hence lower losses. Also, the current control is very fine and the rate of change of current can be minimized resulting in lower acoustic noise.

12. Power converter 2100 can be used for any number of even or odd phase SRMS.

13. Power converter 2100 is applicable to half-wave controlled even or odd phase PMBDCM control, resulting in similar advantages and low cost.

14. When an even number of phases are not available, the converter can be used with two phases making use of the boost stage and one phase using the buck-boost stage of power conversion or vice versa, say for a three-phase machine.

Figure 22:
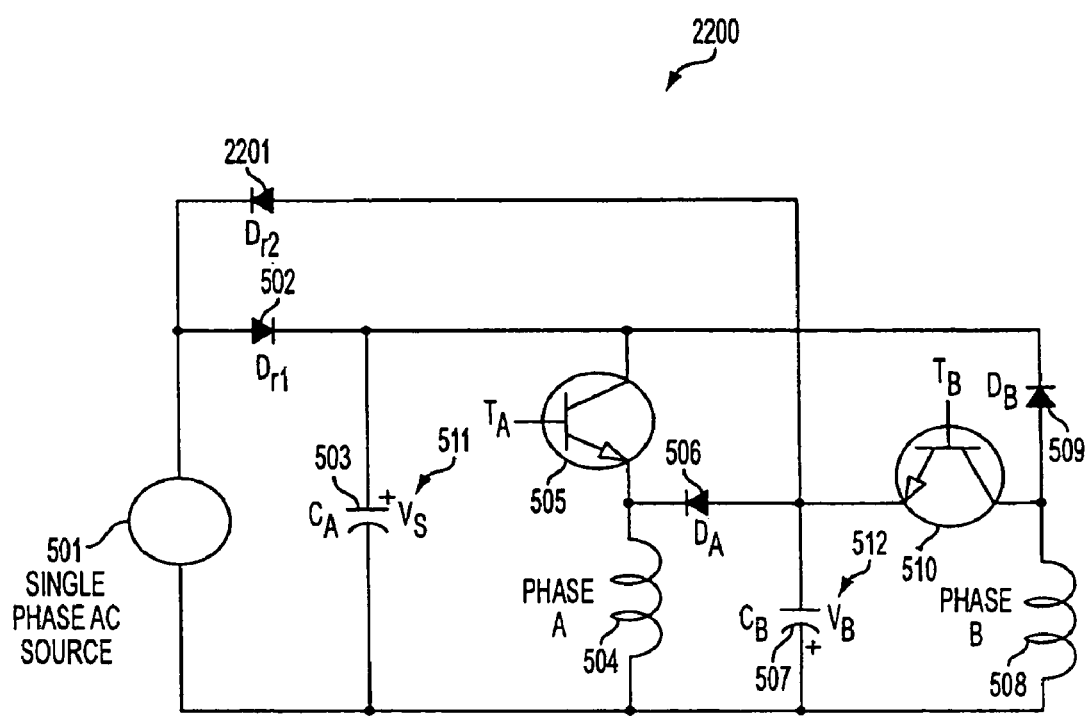
FIG. 22 illustrates the power converter of FIG. 21(a) having independent source of energy for both phase windings.

FIG. 22 illustrates the power converter of FIG. 21(*a*) having an independent source of energy for both phase windings. Independent energy storage is provided in dc source capacitor 503 and intermediate capacitor 507. This has the advantage that phase B winding 508 operation at start-up is independent of phase A winding 504's operation. That means that if phase B winding 508 has to be energized at a given starting position, it cannot operate unless intermediate capacitor 507 has energy. And it cannot have energy unless phase A winding 504 has been energized, as described previously with regard to FIG. 21(*a*).

Regarding power converter 2100, energizing phase A winding 504 leads to a possibility of torque generation in a direction that is not required or intended, resulting in performance degradation at starting. Providing energy to the input capacitor of the boost stage will eliminate this possibility. Such an independent way of providing energy from ac source 501 is made possible in power converter 2200 with an additional source rectifier diode 2201, thus enabling the independent operation of both phases A and B.

Power converter 2200 provides a new power converter topology with independent control of current in the machine phases of a two phase SRM. Power converter 2200 does not require external inductors and is operable with variable voltage input to the machine phases. It also can be extended for any even or odd phase SRM and also for PMBDCM machines and, thereby, can be a universal converter for the brushless machine subset of SRM and PMBDCM machines. It has the unique feature of having one controllable switch and one diode per phase. The input power factor control and input ac line current shaping is possible with this invention, due to the front converter's operation.

Power converter 2200 includes one controllable switch and one diode per phase of the SRM, for an even phase machine. The front-end converter is a buck-boost stage circuit 2101 and the back end is a simple boost stage circuit 2102. Operating the two converter stages absolutely requires inductors, which normally are external and unrelated to the machine. Power converter 2200 uses the machine windings themselves as the inductors for the operation of the converter stages.

Power converter 2200 includes two front-end rectifiers, source rectifier diode 502 and source rectifier diode 2201. DC source capacitor 503 and intermediate capacitor 507 form the dc link filter. The two windings of the two-phase SRM are shown as phase A winding 504 and phase B winding 508, with respective controllable switches of phase A transistor 505 and phase B transistor 510 and their freewheeling diodes, phase A diode 506 and phase B diode 509. Intermediate capacitor 507 is also the intermediate energy storing filter for energizing phase B winding 508, which energy is obtained from the buck-boost action of phase A transistor 505, phase A diode 506, phase A winding 504, and intermediate capacitor 507. Likewise, dc source capacitor 503 serves to save the commutation energy of phase B winding 508. This particular configuration makes the energy input to phase B winding 508 independent of phase A winding 504 operation, and vice versa. This is very important, particularly for two-phase machine drive systems.

Consider a case where phase B winding 508 has to be energized for starting, when the rotor poles are close to phase B winding 508's stator poles. In this case, energy is required in intermediate capacitor 507 to power phase B winding 508. But there is no energy at the start of drive operation and, hence, another way has to be found to prime intermediate capacitor 507. This necessitates the energization of phase A winding 504, even though it is not ideal to do that. Thus, undesirable effects are produced for a shorter interval. In some applications it may not be acceptable. That problem is completely eliminated here.

Furthermore, a two-phase machine operation is possible with this converter. Power converter 2200 has two independent ways of charging the capacitors, giving it a high fault-tolerant capability. For example, one of the front-end diodes may fail, but a source of energy remains for driving the machine system. This is very critical and important in many applications.

Use of two diodes in the front-end rectifier to provide a full-wave rectification reduces the input harmonics, as compared to using half-wave rectification with one diode. This also evenly distributes the input current and does not result in any undue increase in the losses in the diodes and, hence, in the cooling requirements. This increases the reliability of the system and its operation, as failure in one of the diodes does not preclude the operation of the system.

Power converter 2200 provides the following advantages:

1. All the same benefits and advantages provided by power converters 2100 and 2150.

2. It has the additional advantage of independent operation of phase B winding 508 at all times.

3. Also, this makes the source current balanced, as the ac supply current faces full rectification in positive half cycle with source rectifier diode 502 and in negative half cycle with source rectifier diode 2201.

4. A minimum commutation voltage to phase A winding 504 is provided that is at least equal to the maximum of the ac line voltage. The commutation voltage to phase A winding 504 will be lower when buck-boost circuit 2101 operates in the buck mode. This is an important factor.

5. Two front-end diodes for rectifier operation give full-wave operation, resulting in minimum harmonics at the input.

6. A two-diode system increases fault tolerance.

7. The two-diode system, as connected to the machine side converter, endows independent operation of phase A winding 504 and phase B winding 508.

8. The two-diode system distributes the energy, required for two phases, evenly to their respective capacitors. This means the energy required for phase B winding 508 need not flow through phase A winding 504, resulting in high efficiency of the motor drive system.

9. The features of power converter 2200 are applicable to any number of phases and particularly attractive for a two-phase SRM or PMBDCM machine.

10. Number of diodes in the front-end rectifier is only two for full wave operation, and that reduces the power loss and space required for a heat sink in the packaging of the converter.

11. Phase B winding 508's operation is independent of phase A winding 504's operation, as the energy source for it is independent. Phase B winding 508 obtains energy from the ac source through its own rectification. Otherwise, the energy available for phase B winding 508 excitation is very much dependent on the operation of phase A winding 504. This makes the system truly independent at starting, resulting in finer control of starting and operation of the machine.

12. Because power converter 2200 provides independent operation of the phases, as regards to energy availability to individual phases, the machine can operate with two phases unlike other related art schemes which require more than three phases in general, where two or three phases charge the dc link (of the 3rd or 4th phase dc link) for the energization of 3rd or 4th phase, as the case may be. Power converter 2200 removes such a restriction making it suitable for two phases, and even for more.

Figure 23:
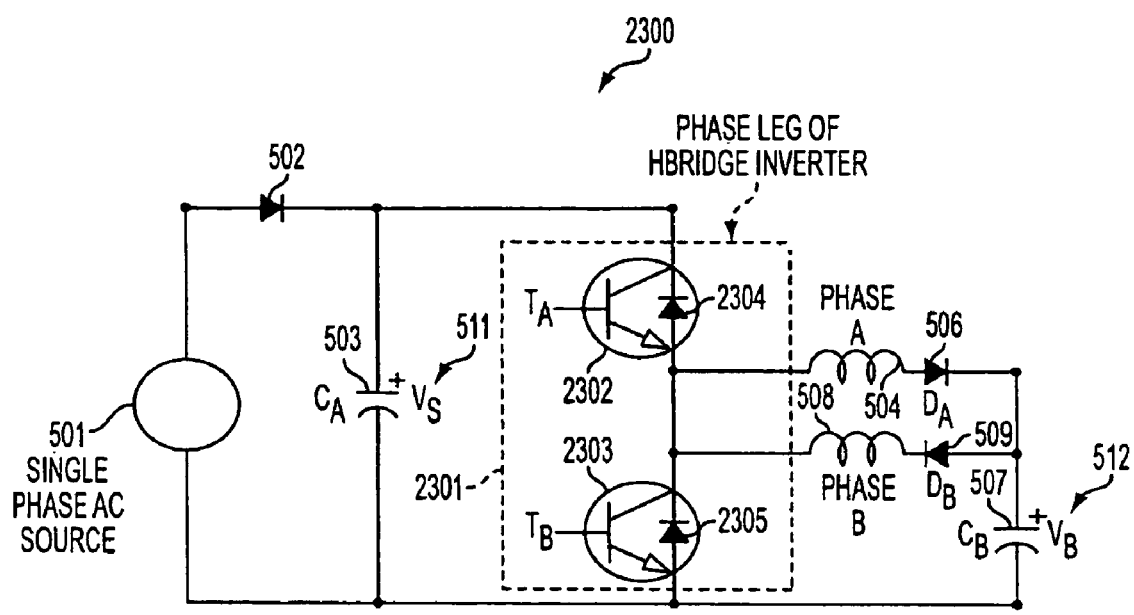
FIG. 23 illustrates a single controllable switch per phase power converter that uses one phase leg of an inverter module.

FIG. 23 illustrates a single controllable switch per phase power converter that uses one phase leg of an inverter module. Power converter 2300 uses a phase leg of an inverter module 2301 and thereby avoids a separate packaging requirement for the controllable switch and the fast diode. A controllable switch 2302, 2303 and a fast anti-parallel diode 2304, 2305 for each respectively connected phase winding 504, 508 are already in the inverter module, connected in anti-parallel.

Power converter 2300 uses inverter module 2301 for compactness and price advantage. Even though inverter module 2301 uses slow steering diodes of a rectifying type, they are inexpensive and have very low losses. Therefore, the thermal packaging requirement is not as severe as that for the packaging of the fast diode, which is required for freewheeling of currents or handling the reactive currents in the SRM.

The invention also can be extended for any even phase SRM and also for PMBDCM machines with half-wave control. Thereby, it can be a universal converter for the brushless machine subset of SRM and PMBDCM machines. Furthermore, power converter 2300 has one controllable switch package, including the anti-parallel diode, and one slow diode per phase winding.

Power converter 2300 has a front-end converter that is a buck stage 2306 and the back end is a simple boost stage 2307. The use of an inverter phase module simplifies the packaging requirement of the controllable switch and the fast diode, used for freewheeling and handling reactive current, in one device. Both such devices are made available in one package, thereby lending themselves to compactness and low cost even in low production quantities.

A four-phase machine can use a four-quadrant chopper module, which includes two phase legs of an inverter module. Such a module is available commercially. Similarly a six-phase machine can use a three-phase full bridge inverter module.

Power converter 2300 includes a front-end rectifier that may have one or four diodes, depending on the power level of the SRM drive system. For illustration, a single source rectifier diode 502 stage is shown. DC source capacitor 503 forms the dc link filter. The two windings of the two-phase SRM are shown as phase A winding 504 and phase B winding 508, with respective controllable switches of phase A transistor 505 and phase B transistor 510 and their freewheeling diodes in anti-parallel. Phase A diode 506 and phase B diode 509 are steering diodes and they are slow. Hence, they can be of a rectifying type with a low conduction voltage drop. They are connected in series with phase A and B windings 504 and 508, respectively, for steering the current. Intermediate capacitor 507 is the intermediate energy storing filter for energizing phase B winding 508.

The operation of the circuit is as follows. Phase A winding 504 is energized by turning on phase A transistor 505. When the current exceeds the command value or has to be extinguished entirely, then it is turned off. The current is taken over by anti-parallel diode 2305 of phase B transistor 510. During all this time, intermediate capacitor 507 is being charged. Then, the action of power converter 2300 is like that of a step-down chopper, which is a buck converter. From the energy stored in intermediate capacitor 507, phase B winding 508 is fed by turning on phase B transistor 510. When the current is to be turned off completely or mitigated, phase B transistor 510 is turned off. This enables anti-parallel diode 2304 of phase A transistor 505 to conduct the current to dc source capacitor 503, resulting in the decay of current in phase B winding 508 and eventually to zeroing of the current. This is the boost action of the converter. Therefore, a buck and boost action of the converter is realized with this arrangement.

The advantages of the buck and boost arrangement are applicable to this case also but with some differences. Power converter 2300 provides the following advantages:

1. All switch ratings are equal to a maximum of the source voltage, $V_S$ 511, or $V_B$, whichever is higher. In a related art split supply converter with a $2V_S$ source voltage, the switch ratings are equal to $2V_S$. Further, a single diode front-end rectifier is not possible with this related art circuit, thereby limiting the choice of front end rectifiers.

2. Switching of controllable switches 2302 and 2303 can be minimized at high speeds.

3. No external inductors are necessary for the operation of front-end buck and back-end boost stage of the converter.

4. The voltage rating of the capacitors is $V_S$ or $V_B$, whichever is higher.

5. Intermediate capacitor 507 can be much smaller than dc source capacitor 503.

6. The dc link input voltage is not derated, as in the case of the related art split do supply converter, resulting in higher utilization of the voltage source and, hence, lower current in the machine phases.

7. Power converter 2300 provides for one controllable switch and diode per phase without derating the dc link voltage and external inductors.

8. Because of boost action of the second converter stage, the motor drive can operate at high speeds without sacrificing the power output that may arise in flux weakening controls of other related art drive systems, as higher voltage required at high speeds can be provided by the boost action of the converter.

9. Because of the boost stage, higher voltages than the source voltage can result in a faster rise of current, contributing to high dynamic response.

10. Below the rated or nominal speed operation of the machine, the phase A converter stage can operate in the buck mode, resulting in lower switching of phase B winding 508 and, hence, lower losses. Also, the current control is very fine and rate of change of current can be minimized resulting in lower acoustic noise.

11. Power converter 2300 can be used for any number of even phase SRMs.

12. Power converter 2300 is applicable to half-wave controlled even phase PMBDCM control, resulting in similar advantages and low cost.

13. Inverter phase leg module 2301 is used, thereby cutting down the packaging cost and enabling the use of SRMs in many more applications, by using the readily available inverter phase leg module 2301.

14. The buck and boost actions for phases A and B, respectively, are preserved in this invention, without external inductors, and so too are the accompanying advantages.

However, the efficiency of power converter 2300 is slightly lower than some other configurations. This is due to a controllable switch 2302, 2303 or an anti-parallel diode 2304, 2305 always being in series with a steering diode 506, 509 during conduction. This results in a higher total conduction voltage drop and hence losses. Also, independent current control and conduction of phases are not possible because of the freewheeling provided by the anti-parallel diode. The anti-parallel diode and its switch have to conduct at the same time, for initiating a current in the succeeding phase. Therefore, a current discontinuity and torque discontinuity may occur. This is not a serious disadvantage in low performance but high volume applications, such as appliances. Additionally, because of mutual inductance between phases, there is a possibility that there will be circulating current in the phase windings, which can be minimized by proper design of the machine but cannot be eliminated altogether. Again, for low performance applications, this is not a severe disadvantage.

Figure 24:
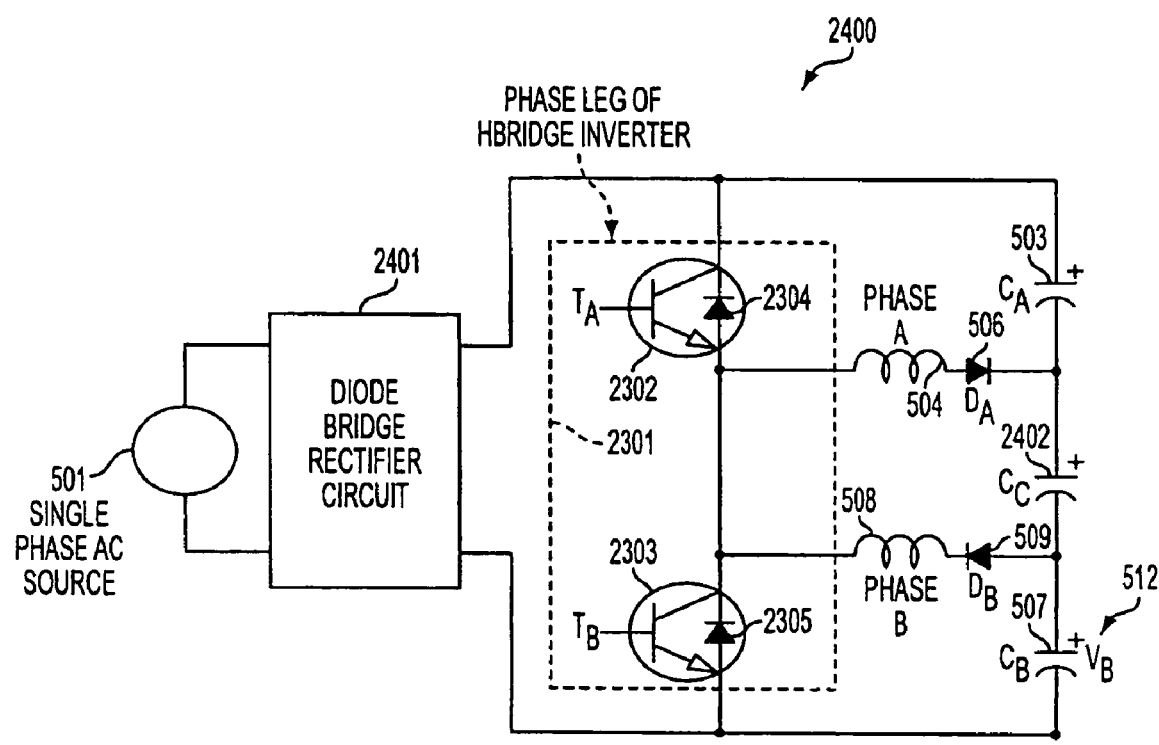
FIG. 24 illustrates a single controllable switch per phase power converter that uses one phase leg of an inverter module and inhibits circulation of a current through the phase windings of a motor.

The disadvantages discussed are overcome in a circuit shown in FIG. 24. FIG. 24 illustrates a single controllable switch per phase power converter that uses one phase leg of an inverter module and inhibits circulation of a current through the phase windings of a motor. Power converter 2400 uses a phase leg of an inverter module 2301 and thereby avoids a separate packaging requirement for the controllable switch and the fast diode. A controllable switch 2302, 2303 and a fast anti-parallel diode 2304, 2305 for each respectively connected phase winding 504, 508 are already in inverter module 2301, connected in anti-parallel.

Power converter 2400 uses inverter module 2301 for compactness and price advantage. Even though inverter module 2301 uses slow steering diodes of a rectifying type, they are inexpensive and have very low losses. Therefore, the thermal packaging requirement is not as severe as that for the packaging of the fast diode, which is required for freewheeling of currents or handling the reactive currents in the SRM.

The invention also can be extended for any even phase SRM and also for PMBDCM machines with half-wave control. Thereby, it can be a universal converter for the brushless machine subset of SRM and PMBDCM machines. Furthermore, power converter 2400 has one controllable switch package, including the anti-parallel diode, and one slow diode per phase winding for current steering.

Power converter 2400 has a front-end converter that is a buck stage 2306 comprising switch 2302, phase A winding 504, diode 506, and capacitor 503, which provides the source voltage. The back-end converter is also a simple buck stage 2307 comprising switch 2303, phase B winding 508, diode 509, and capacitor 507, which provides source voltage $V_B$ 512. The use of inverter phase module 2301 simplifies the packaging requirement of the controllable switch and the fast diode, used for freewheeling and handling reactive current, in one device. Both such devices are made available in one package, thereby lending themselves to compactness and low cost even in low production quantities.

A four-phase machine can use a four-quadrant chopper module, which includes two phase legs of an inverter module. Such a module is available commercially. Similarly a six-phase machine can use a three-phase full bridge inverter module.

Power converter 2400 includes a front-end rectifier that may have one or four diodes, depending on the power level of the SRM drive system. For illustration, a full-wave source rectifier stage 2401 is shown. DC source capacitor 503 forms part of the dc link filter along with capacitor 2402 and capacitor 507. The two windings of the two-phase SRM are shown as phase A winding 504 and phase B winding 508, with respective controllable switches of phase A transistor 2302 and phase B transistor 2303 and their freewheeling diodes in anti-parallel 2304 and 2305, respectively. Phase A diode 506 and phase B diode 509 are steering diodes and they are slow. Hence, they can be of a rectifying type with a low conduction voltage drop. They are connected in series with phase A and B windings 504 and 508, respectively, for steering the current. Intermediate capacitor 507 is the intermediate energy storing filter for energizing phase B winding 508.

DC source capacitor 503, intermediate capacitor 507, and an anti-circulation capacitor 2402 are serially connected in parallel with the rectified ac source 501. By using three capacitors 503, 2402, and 507 in the dc supply and by the manner in which they are connected to the machine phases, the circulation current between the machine phases, phase A winding 504 and phase B winding 508, is avoided even with a high mutual coupling between the phases. Note that only a small voltage across anti-circulation capacitor 2402 is needed to avoid such a circulation current between the windings.

The operation of the circuit is as follows. Phase A winding 504 is energized by turning on phase A transistor 2302 and at the same time the voltage across a phase A is almost equal to voltage 512, resulting in the current in phase A winding 504 rising. When the current exceeds the command value or has to be extinguished entirely, then it is turned off. The current is taken over by anti-parallel diode 2305 of phase B transistor 2303. The path for the current now consists of diode 2304, phase A winding 504, diode 506 and capacitors 2402 and 507, resulting in a negative voltage being applied across the phase A winding 504, thus forcing the current to decay. During all this time, dc source capacitor, anti-circulation capacitor 2402, and intermediate capacitor 507 are being charged from the rectified ac source. Anti-circulation capacitor 2402 is much smaller than the other two capacitors and, therefore, its voltage is much smaller. Furthermore, this voltage can be used for powering the gate drive circuit of phase A transistor 505, and this is a significant advantage. This also provides the distribution of charge across the three capacitors and prevents anti-circulation capacitor 2402 from accumulating more charge than is intended. The action of this converter part is like that of a step-down chopper, which is a buck converter. From the energy stored in intermediate capacitor 507, phase B winding 508 is fed by turning on phase B transistor 510. When the current is to be turned off completely or mitigated, phase B transistor 2303 is turned off, thus enabling the anti-parallel diode of phase A transistor 2302 to conduct the current to the dc link input capacitor, resulting in the decay of current in phase B winding 508 and eventually to zeroing of the current.

Power converter 2400 provides the following advantages:

1. All switch ratings are equal to a maximum of the source voltage. In a related art split supply converter, with $2V_S$ source voltage, the switch ratings are equal to $2V_S$. Further, a single diode front end rectifier is not possible with this related art circuit, thereby limiting the choice of front end rectifiers.

2. Switching of controllable switches 2302 and 2303 can be minimized at high speeds.

3. No external inductors are necessary for the operation of the front-end buck and back-end boost stage of the converter.

4. The voltage rating of the capacitors is nearly half of the dc link, with that of anti-circulation capacitor 2402 being much smaller.

5. Anti-circulation capacitor 2402 can be much smaller than dc source capacitor 503 and intermediate capacitor 507.

6. This topology provides for one controllable switch and steering diode per phase without external inductors.

7. This converter topology can be used for any number of even phase SRMs.

8. The same converter topology is applicable to half-wave controlled even phase PMBDCM control, resulting in similar advantages and low cost.

9. Inverter phase leg module 2301 is used, thereby cutting down the packaging cost and enabling the use of SRMs in many more applications, by using the readily available inverter phase leg modules 2301.

10. The buck actions for phases A and B are preserved in this invention, without external inductors, and so too are the accompanying advantages.

11. In spite of mutual inductance between phases, the possibility of a circulating current in the phase windings is eliminated in this converter topology because of the voltage in the intermediate capacitor 2402 that acts against the current circulation.

12. The energy stored in the anti-circulation capacitor 2402 is used for gating the top switch. Thereby, the energy build-up in anti-circulation capacitor 2402 is avoided, while eliminating a need for a separate power supply for the gating circuit of the top switch. The fact that the energy build-up can be neutralized in this way provides an important innovation.

However, the efficiency of power converter 2400 is slightly lower for this configuration. This is due to a controllable switch 2302, 2303 or an anti-parallel diode 2304, 2305 always being in series with a steering diode 506, 509 during conduction. This results in a higher total conduction voltage drop and an efficiency loss. Independent current control and conduction of phases are not possible because of the freewheeling provided by the anti-parallel diode. The freewheeling anti-parallel diode and its associated switch have to conduct at the same time for initiating a current in the succeeding phase. Therefore, a current discontinuity and torque discontinuity has to be accepted in order to use this converter. Note that this is not a serious disadvantage in low performance but high volume applications such as appliances. The dc link input voltage is derated as in the case of the related art split dc supply converter, resulting in lower utilization of the voltage source and, hence, higher current in the machine phases. This can be overcome using a voltage doubler circuit in the front-end rectifier circuit, but then the voltage rating of the switches increases.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A power converter for a switched reluctance motor or a permanent magnet brushless direct current (dc) motor having first and second phase windings, the power converter comprising:
   a boost partial circuit for connecting with the first phase winding of the motor to form a boost circuit;
   a buck partial circuit for connecting with the second phase winding of the motor to form a buck circuit; and
   a first capacitor that is shared by the boost and buck partial circuits to:
   (a) store energy received from the boost partial circuit and provide the stored energy to the buck partial circuit, or
   (b) store energy received from the buck partial circuit and provide the stored energy to the boost partial circuit wherein:
   each of the boost and buck partial circuits comprises a single controllable switch and a rectifier,
   the controllable switches for both the boost and buck partial circuits are provided by a phase leg of an inverter module,
   each single controllable switch regulates the energization of the corresponding phase winding, and
   each rectifier regulates the flow of current for charging or discharging the first capacitor or energizing or discharging the corresponding phase winding.

2. The power converter of claim 1, wherein a common terminal interconnecting the controllable switches is provided for connecting with a terminal of each of the first and second phase windings.

3. A power converter for a switched reluctance motor or a permanent magnet brushless direct current (dc) motor having first and second phase windings, the power converter comprising:
   a boost partial circuit for connecting with the first phase winding of the motor to form a boost circuit; and
   a buck partial circuit for connecting with the second phase winding of the motor to form a buck circuit, wherein said boost and buck circuits cooperate to provide a unity power factor.

4. A power converter for a switched reluctance motor or a permanent magnet brushless direct current (dc) motor having first and second phase windings, the power converter comprising:
   a boost partial circuit for connecting with the first phase winding of the motor to form a boost circuit;
   a buck partial circuit for connecting with the second phase winding of the motor to form a buck circuit; and
   a first capacitor that is shared by the boost and buck partial circuits to:
   (a) store energy received from the boost partial circuit and provide the stored energy to the buck partial circuit, or
   (b) store energy received from the buck partial circuit and provide the stored energy to the boost partial circuit, wherein
   said boost and buck circuits cooperate to provide input alternating current shaping.

5. A power converter for a switched reluctance motor or a permanent magnet brushless direct current (dc) motor having first and second phase windings, the power converter comprising:
   a first buck partial circuit for connecting with the first phase winding of the motor to form a first buck circuit, the first buck partial circuit comprising a first rectifier;
   a second buck partial circuit for connecting with the second phase winding of the motor to form a second buck circuit, the second buck partial circuit comprising a second rectifier; and
   three serially connected capacitors that together are connected in parallel with a dc voltage source, wherein:
   the first buck partial circuit generates a step-down voltage in cooperation with an inductance provided by the first phase winding,
   the second buck partial circuit generates a step-down voltage in cooperation with an inductance provided by the second phase winding,
   a first terminal of a first of the three serially connected capacitors is connected to the first phase winding by the first rectifier,
   a second terminal of the first capacitor is connected to the second phase winding by the second rectifier, and
   the first capacitor substantially prevents a current from simultaneously circulating through the first and second phase windings.

6. The power converter of claim 5, wherein:
   each of the first and second buck partial circuits comprises a single controllable switch,
   the controllable switches for both the first and second buck partial circuits are provided by a phase leg of an inverter module, and
   each controllable switch regulates the energization of the corresponding phase winding.

7. The power converter of claim 6, wherein a second of the three serially connected capacitors utilizes energy stored therein for a gating operation of a first of the controllable switches.

8. A power converter for a switched reluctance motor or a permanent magnet brushless direct current (dc) motor having first, second, and third phase windings, the power converter comprising:
   a boost-buck partial circuit for connecting with the first phase winding of the motor to form a boost circuit and for connecting with the second phase winding of the motor to form a first buck circuit; and
   a buck partial circuit for connecting with the third phase winding of the motor to form a second buck circuit, wherein:
   the boost-buck partial circuit generates a step-up voltage in cooperation with an inductance provided by the first phase winding and generates a first stepdown voltage in cooperation with an inductance provided by the second phase winding, and
   the buck partial circuit generates a second step-down voltage in cooperation with an inductance provided by the third phase winding.

9. The power converter of claim 8, wherein a capacitor is shared by the boost-buck and buck partial circuits to store energy received from the boost-buck partial circuit and provide the stored energy to the buck partial circuit.

10. The power converter of claim 9, wherein the energy stored by the capacitor is provided to the buck partial circuit for energizing the third phase winding of the motor.

11. The power converter of claim 10 wherein:
   the boost-buck partial circuit comprises a first valve for completing a circuit that energizes the first phase winding;

the buck partial circuit comprises a second valve for completing a circuit that discharges the energy stored by the capacitor into the third phase winding; and the buck partial circuit comprises a rectifier for preventing the direct flow of current from the capacitor to the second valve.

12. The power converter of claim 9, wherein:
the boost-buck partial circuit comprises a single controllable switch;
the buck partial circuit comprises a single controllable switch;
the single controllable switch of the boost-buck partial circuit completes a circuit that energizes the first phase winding; and
the single controllable switch of the buck partial circuit completes a circuit that energizes the third phase winding with the energy stored by the capacitor.

13. The power converter of claim 8, wherein:
the boost-buck partial circuit comprises a single controllable switch;
the buck partial circuit comprises a single controllable switch;
the single controllable switch of the boost-buck partial circuit completes a circuit that energizes the first phase winding; and
the single controllable switch of the buck partial circuit completes a circuit that energizes the third phase winding.

14. The power converter of claim 8, further comprising a rectifier that rectifies an alternating current voltage into a dc voltage and provides the dc voltage to the boost and buck partial circuits.

15. The power converter of claim 14, wherein the rectifier is a full wave rectifier.

16. The power converter of claim 8, wherein said boost and first and second buck circuits cooperate to provide a unity power factor.

17. The power converter of claim 8, wherein said boost and first and second buck circuits cooperate to provide input alternating current shaping.

18. A power converter for a switched reluctance motor or a permanent magnet brushless direct current (dc) motor having first and second phase windings, the power converter comprising:
a front-end buck partial circuit for connecting with the first phase winding of the motor to form a front-end buck circuit; and
a back-end buck partial circuit for connecting with the second phase winding of the motor to form a back-end buck circuit, wherein:
the front-end buck partial circuit generates a first step-down voltage in cooperation with an inductance provided by the first phase winding,
the back-end buck partial circuit generates a second step-down voltage in cooperation with an inductance provided by the second phase winding, and
a capacitor is shared by the front-end and back-end buck partial circuits to store energy received from the front-end buck partial circuit and provide the stored energy to the back-end buck partial circuit.

19. The power converter of claim 18, wherein:
each of the front-end and back-end buck partial circuits comprises a single controllable switch; and
each single controllable switch regulates the energization of the corresponding phase winding.

20. The power converter of claim 19, wherein:
each of the front-end and back-end buck partial circuits comprises a single rectifier; and
each single rectifier regulates the flow of current for charging or discharging the capacitor or energizing or discharging the corresponding phase winding.

21. The power converter of claim 18, further comprising:
a rectifier that rectifies an alternating current into a direct current; and
a dc storage capacitor that stores energy from the direct current provided by the rectifier and provides a dc voltage source to the front-end and back-end buck partial circuits using the stored energy.

22. The power converter of claim 21, wherein the electrical structures of the front-end and back-end buck partial circuits cooperate to apply substantially the entire potential of the dc voltage source to each of the first and second phase windings.

23. A power converter for a switched reluctance motor or a permanent magnet brushless direct current (dc) motor having first and second phase windings, the power converter comprising:
a buck-boost partial circuit for connecting with the first phase winding of the motor to form a buck-boost circuit; and
a boost partial circuit for connecting with the second phase winding of the motor to form a boost circuit, wherein:
the buck-boost partial circuit generates a first step-up voltage in cooperation with an inductance provided by the first phase winding and generates a step-down voltage in cooperation with the inductance provided by the first phase winding, and
the boost partial circuit generates a second step-up voltage in cooperation with an inductance provided by the second phase winding.

24. The power converter of claim 23, wherein:
each of the buck-boost and boost partial circuits comprises a single controllable switch; and
each controllable switch regulates the energization of the corresponding phase winding.

25. The power converter of claim 23, wherein said buck-boost and boost circuits cooperate to provide a near unity power factor.

26. The power converter of claim 23 wherein said buck-boost and boost circuits cooperate to provide input alternating current shaping.

27. The power converter of claim 23, wherein a first capacitor is shared by the buck-boost and boost partial circuits to store energy received from the buck-boost partial circuit and provide the stored energy to the boost partial circuit.

28. The power converter of claim 27, wherein:
each of the buck-boost and boost partial circuits comprises a single controllable switch and a single rectifier;
each controllable switch regulates the energization of the corresponding phase winding; and
each rectifier regulates the flow of current for charging or discharging the first capacitor or energizing or discharging the corresponding phase winding.

29. The power converter of claim 27, further comprising:
a rectifier that rectifies an alternating current into a direct current; and
a dc storage capacitor that stores energy from the direct current provided by the rectifier and provides a dc voltage source to the buck-boost and boost partial circuits using the stored energy.

30. The power converter of claim 29, wherein the combined electrical structures of the buck-boost and boost partial circuits cooperate to limit a voltage developed across the shared first capacitor to a minimum voltage equal to the dc voltage source.

31. The power converter of claim 29, wherein the electrical structures of the buck-boost and boost partial circuits cooperate to apply substantially the entire potential of the dc voltage source to each of the first and second phase windings.

32. The power converter of claim 27, further comprising:
a first rectifier that rectifies an alternating current into a direct current;
a second rectifier that returns current, which is generated from the energy stored to the shared first capacitor, to a source of the alternating current; and
a dc storage capacitor that stores energy from the direct current provided by the first rectifier and provides a dc voltage source to the buck-boost and boost partial circuits using the stored energy of the dc storage capacitor.

33. The power converter of claim 27, further comprising:
two rectifiers that rectify the full wave of an alternating current into a direct current, wherein
the two rectifiers are connected to the buck-boost and boost partial circuits to provide for the independent energization and de-energization of the first and second phase windings.

34. The power converter of claim 33, further comprising a dc storage capacitor that stores energy from the direct current and provides a dc voltage source to the buck-boost and boost partial circuits using the stored energy.

35. The power converter of claim 34, wherein the electrical structures of the buck-boost and boost partial circuits cooperate to apply substantially the entire potential of the dc voltage source to each of the first and second phase windings.

36. The power converter of claim 27, further comprising a second capacitor that is shared by the buck-boost and boost partial circuits to store energy received from the boost partial circuit and provide the stored energy to the buck-boost partial circuit.

37. The power converter of claim 36, wherein:
the energy stored by the first capacitor is provided to the boost partial circuit for energizing the second phase winding of the motor; and
the energy stored by the second capacitor is provided to the buck-boost partial circuit for energizing the first phase winding of the motor.

38. The power converter of claim 36, wherein:
each of the buck-boost and boost partial circuits comprises a single controllable switch and a single rectifier;
each controllable switch regulates the energization of the corresponding phase winding; and
each rectifier regulates the flow of current for charging or discharging the first or second capacitors or energizing or discharging the phase windings.

39. The power converter of claim 36, further comprising:
a first valve for completing a circuit that discharges the energy stored by the second capacitor into the first phase winding; and
a second valve for completing a circuit that discharges the energy stored by the first capacitor into the second phase winding.

40. The power converter of claim 39, further comprising:
a first rectifier that prevents energy stored in the second capacitor from discharging directly into the second phase winding or the second valve; and
a second rectifier that prevents energy stored in the first capacitor from discharging directly into the first phase winding.

41. A power converter for a switched reluctance motor or a permanent magnet brushless direct current (dc) motor having first and second phase windings, the power converter comprising:
a first boost partial circuit for connecting with the first phase winding of the motor to form a first boost circuit;
a second boost partial circuit for connecting with the second phase winding of the motor to form a second boost circuit; and
a first capacitor that is shared by the first and second boost partial circuits to store energy received from the first boost partial circuit and provide the stored energy to the second boost partial circuit.

42. The power converter of claim 41, wherein:
each of the first and second boost partial circuits comprises a single controllable switch and a single rectifier;
each single controllable switch regulates the energization of the corresponding phase winding; and
each single rectifier regulates the flow of current for charging or discharging the first capacitor or energizing or discharging the corresponding phase winding.

43. The power converter of claim 41, further comprising:
a rectifier that rectifies an alternating current into a direct current; and
a dc storage capacitor that stores energy from the direct current provided by the rectifier and provides a dc voltage source to the first and second boost partial circuits using the stored energy.

44. The power converter of claim 43, wherein the electrical structures of the first and second boost partial circuits cooperate to apply substantially the entire potential of the dc voltage source or more to each of the first and second phase windings.

45. The power converter of claim 41, further comprising a second capacitor that is shared by the first and second boost partial circuits to store energy received from the second boost partial circuit and provide the stored energy to the first boost partial circuit.

46. The power converter of claim 45, wherein:
the energy stored by the first capacitor is provided to the second boost partial circuit for energizing the second phase winding of the motor; and
the energy stored by the second capacitor is provided to the first boost partial circuit for energizing the first phase winding of the motor.

47. The power converter of claim 45, wherein:
each of the first and second boost partial circuits comprises a single controllable switch and a single rectifier;
each controllable switch regulates the energization of the corresponding phase winding; and
each rectifier regulates the flow of current for charging or discharging the first or second capacitor.

48. The power converter of claim 45, further comprising:
a first rectifier that discharges energy stored in the first phase winding into the first capacitor; and
a second rectifier that discharges energy stored in the second phase winding into the second capacitor.

49. The power converter of claim 48, wherein:
the first rectifier prevents energy stored in the first capacitor from discharging directly into the first phase winding; and
the second rectifier prevents energy stored in the second capacitor from discharging directly into the second phase winding.

50. The power converter of claim 48, further comprising:
a first valve for completing a circuit that discharges the energy stored by the second capacitor into the first phase winding; and
a second valve for completing a circuit that discharges the energy stored by the first capacitor into the second phase winding.

51. The power converter of claim 50, wherein:
the first rectifier prevents energy stored in the first capacitor from discharging directly into the first phase winding or the first valve; and
the second rectifier prevents energy stored in the second capacitor from discharging directly into the second phase winding or the second valve.

52. A power converter for a switched reluctance motor or a permanent magnet brushless direct current (dc) motor having first and second phase windings, the power converter comprising:
a boost partial circuit for connecting with the first phase winding of the motor to form a boost circuit;
a buck partial circuit for connecting with the second phase winding of the motor to form a buck circuit; and
a first capacitor that is shared by the boost and buck partial circuits to:
(a) store energy received from the boost partial circuit and provide the stored energy to the buck partial circuit, or
(b) store energy received from the buck partial circuit and provide the stored energy to the boost partial circuit, wherein:
each of the boost and buck partial circuits comprises a single controllable switch and a single rectifier;
each controllable switch regulates the energization of the corresponding phase winding; and
each rectifier regulates the flow of current for charging or discharging the first capacitor or discharging the corresponding phase winding.

53. The power converter of claim 52, further comprising a full wave rectifier that rectifies an alternating current into a direct current and provides a dc voltage source to the boost and buck partial circuits.

54. The power converter of claim 52, wherein a common terminal interconnecting the controllable switches is provided for connecting with a terminal of each of the first and second phase windings.

55. The power converter of claim 54, wherein a terminal of the shared first capacitor is connected to a terminal of each of the rectifiers of the respective boost and buck partial circuits.

56. The power converter of claim 54, further comprising:
a power source rectifier that rectifies an alternating current into a direct current; and
a dc storage capacitor that stores energy from the direct current provided by the power source rectifier and provides a dc voltage source to the boost and buck partial circuits using the stored energy.

57. The power converter of claim 56, wherein the combined electrical structures of the boost and buck partial circuits cooperate to limit a voltage developed across the shared first capacitor to a minimum voltage equal to that of the dc voltage source.

58. The power converter of claim 56, wherein the electrical structures of the boost and buck partial circuits cooperate to apply substantially the entire potential of the dc voltage source to each of the first and second phase windings.

59. A power converter for a switched reluctance motor or a permanent magnet brushless direct current (dc) motor having first and second phase windings, the power converter comprising:
a boost partial circuit for connecting with the first phase winding of the motor to form a boost circuit;
a buck partial circuit for connecting with the second phase winding of the motor to form a buck circuit;
a first capacitor that is shared by the boost and buck partial circuits to:
(a) store enerqy received from the boost partial circuit and provide the stored enerqy to the buck partial circuit, or
(b) store energy received from the buck partial circuit and provide the stored energy to the boost partial circuit;
a first rectifier that discharges energy stored in the first phase winding into the first capacitor; and
a second rectifier that discharges energy stored in the second phase winding.

60. The power converter of claim 59, wherein the first rectifier prevents energy stored in the first capacitor from discharging directly into the first phase winding.

61. The power converter of claim 59, further comprising:
a first valve for completing a circuit that energizes the first phase winding; and
a second valve for completing a circuit that discharges the energy stored by the first capacitor into the second phase winding.

62. The power converter of claim 61, wherein the first rectifier prevents energy stored in the first capacitor from discharging directly into the first phase winding or the first valve.

63. A power converter for a switched reluctance motor or a permanent magnet brushless direct current (dc) motor having first and second phase windings, the power converter comprising:
a boost partial circuit for connecting with the first phase winding of the motor to form a boost circuit;
a buck partial circuit for connecting with the second phase winding of the motor to form a buck circuit;
a first capacitor that is shared by the boost and buck partial circuits to:
(a) store energy received from the boost partial circuit and provide the stored energy to the buck partial circuit, or
(b) store energy received from the buck partial circuit and provide the stored energy to the boost partial circuit; and
a second capacitor that is shared by the boost and buck partial circuits to store energy received from the buck partial circuit and provide the stored energy to the boost partial circuit, wherein
the first capacitor stores energy received from the boost partial circuit and provides the stored energy to the buck partial circuit.

64. The power converter of claim 63, further comprising:
a first valve for completing a circuit that discharges the energy stored by the second capacitor into the first phase winding; and
a second valve for completing a circuit that discharges the energy stored by the first capacitor into the second phase winding.

* * * * *